US009582804B2

(12) United States Patent
Martinez et al.

(10) Patent No.: US 9,582,804 B2
(45) Date of Patent: Feb. 28, 2017

(54) LINK RETROFITTING OF DIGITAL MEDIA OBJECTS

(75) Inventors: Ronald Martinez, San Francisco, CA (US); Chris Kalaboukis, Los Gatos, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 1223 days.

(21) Appl. No.: 11/615,654

(22) Filed: Dec. 22, 2006

(65) Prior Publication Data

US 2008/0154951 A1  Jun. 26, 2008

(51) Int. Cl.
*G06Q 30/02* (2012.01)

(52) U.S. Cl.
CPC ......... *G06Q 30/02* (2013.01); *G06Q 30/0273* (2013.01)

(58) Field of Classification Search
CPC ........... G06Q 30/0251; G06Q 30/0277; G06Q 50/01; G06Q 30/0241; G06Q 30/00; G06Q 30/0273; G06Q 30/0274; G06Q 30/0276
USPC ....... 715/206, 256, 257, 241, 254, 205, 208, 715/234; 707/103 Y, E17.022; 705/14.49, 67, 69, 73
See application file for complete search history.

(56) References Cited

U.S. PATENT DOCUMENTS

| 5,987,480 A | 11/1999 | Donohue |
| 6,141,010 A | 10/2000 | Hoyle |
| 6,341,353 B1 | 1/2002 | Herman |
| 6,378,075 B1 | 4/2002 | Goldstein |
| 6,556,983 B1 * | 4/2003 | Altschuler et al. ............. 706/55 |

(Continued)

FOREIGN PATENT DOCUMENTS

| KR | 10-2001-0097062 A | 11/2001 |
| KR | 2004094555 | 11/2004 |

(Continued)

OTHER PUBLICATIONS

Yahoo! Privacy Center, published by yahoo.com on Mar. 25, 2004, pp. 1-87.*

(Continued)

*Primary Examiner* — Stephen Hong
*Assistant Examiner* — Ahamed I Nazar
(74) *Attorney, Agent, or Firm* — James J. DeCarlo; Greenberg Traurig LLP

(57) ABSTRACT

A digital media link embedding mechanism for generating one or more links for digital media objects embedded in network resources, such as HyperText Markup Language (HTML) or extensible markup language (XML) pages. Particular implementations of the invention allow network application hosting sites, such as blogging sites and social networking or media sites, to automatically insert revenue generating and/or informational links in proximity to digital media objects embedded by users into personal pages, blog entries, on-line forum posts, and the like. In one implementation, analysis to generate the media links focuses on data surrounding a given digitial content object to improve the relevance, or descriptiveness, of the links. Such media-related ad or search links may be more performant (relative to clickthru rates), since the concepts or keywords used to generate the ad and or search are extracted from data surrounding the digital content.

22 Claims, 17 Drawing Sheets

(56) References Cited

U.S. PATENT DOCUMENTS

| | | |
|---|---|---|
| 6,594,640 B1 | 7/2003 | Postrel |
| 6,727,996 B1 | 4/2004 | Silverbrook |
| 6,868,525 B1 | 3/2005 | Szabo |
| 6,892,226 B1 | 5/2005 | Tso |
| 6,954,934 B2 | 10/2005 | Kumar |
| 7,062,475 B1 | 6/2006 | Szabo |
| 7,267,279 B2 | 9/2007 | Melick |
| 7,310,516 B1 | 12/2007 | Vacanti |
| 7,418,657 B2 * | 8/2008 | Gorelick et al. ............ 715/234 |
| 7,451,152 B2 | 11/2008 | Kraft |
| 7,467,349 B1 | 12/2008 | Bryar |
| 7,546,249 B2 | 6/2009 | Main |
| 7,574,659 B2 | 8/2009 | Szabo |
| 7,627,830 B1 | 12/2009 | Espinoza |
| 8,788,572 B1 * | 7/2014 | Walsh .................. H04L 29/06 709/203 |
| 2002/0013727 A1 | 1/2002 | Lee |
| 2002/0022999 A1 | 2/2002 | Shuster |
| 2002/0038384 A1 | 3/2002 | Khan |
| 2002/0073043 A1 | 6/2002 | Herman |
| 2002/0146122 A1 | 10/2002 | Vestergaard |
| 2002/0188508 A1 | 12/2002 | Lee |
| 2003/0023973 A1 | 1/2003 | Monson |
| 2004/0093327 A1 * | 5/2004 | Anderson ............ G06Q 30/02 |
| 2004/0119741 A1 | 6/2004 | Teng |
| 2004/0133469 A1 | 7/2004 | Chang |
| 2004/0221231 A1 | 11/2004 | Madril, Jr. |
| 2004/0250205 A1 * | 12/2004 | Conning ............ G06F 17/3089 715/243 |
| 2004/0267723 A1 | 12/2004 | Bharat |
| 2005/0004909 A1 * | 1/2005 | Stevenson et al. ............... 707/5 |
| 2005/0010653 A1 | 1/2005 | McCanne |
| 2005/0027821 A1 | 2/2005 | Alexander |
| 2005/0076222 A1 | 4/2005 | Olkin et al. |
| 2005/0114230 A1 | 5/2005 | Fang |
| 2005/0165766 A1 * | 7/2005 | Szabo ............... 707/3 |
| 2005/0216572 A1 | 9/2005 | Tso |
| 2005/0222966 A1 * | 10/2005 | Sadri et al. ............ 707/1 |
| 2005/0234953 A1 * | 10/2005 | Zhang et al. ............ 707/101 |
| 2005/0261964 A1 | 11/2005 | Fang |
| 2006/0015904 A1 | 1/2006 | Marcus |
| 2006/0059462 A1 | 3/2006 | Yamamoto |
| 2006/0085741 A1 | 4/2006 | Weiner |
| 2006/0106866 A1 * | 5/2006 | Green et al. ............ 707/104.1 |
| 2006/0116924 A1 * | 6/2006 | Angles et al. ............ 705/14 |
| 2006/0129907 A1 | 6/2006 | Volk |
| 2006/0136391 A1 * | 6/2006 | Morris ............ G06F 17/30864 |
| 2006/0179453 A1 * | 8/2006 | Kadie ............ G06Q 30/02 725/34 |
| 2006/0224690 A1 | 10/2006 | Falkenburg |
| 2006/0242007 A1 | 10/2006 | Leong |
| 2006/0287916 A1 * | 12/2006 | Starr ............ G06Q 30/02 705/14.46 |
| 2006/0294074 A1 | 12/2006 | Chang |
| 2006/0294571 A1 | 12/2006 | Moore et al. |
| 2007/0005725 A1 | 1/2007 | Morris |
| 2007/0067493 A1 * | 3/2007 | Issa ............ G06Q 30/02 709/246 |
| 2007/0070066 A1 | 3/2007 | Bakhash |
| 2007/0073756 A1 * | 3/2007 | Manhas ............ G06F 17/30663 |
| 2007/0083611 A1 | 4/2007 | Farago et al. |
| 2007/0097959 A1 * | 5/2007 | Taylor ............ 370/352 |
| 2007/0143264 A1 | 6/2007 | Szeto |
| 2007/0156726 A1 | 7/2007 | Levy |
| 2007/0157228 A1 * | 7/2007 | Bayer et al. ............ 725/34 |
| 2007/0244900 A1 | 10/2007 | Hopkins |
| 2008/0071612 A1 | 3/2008 | Mah et al. |
| 2008/0082904 A1 | 4/2008 | Martinez |
| 2008/0082905 A1 | 4/2008 | Martinez |
| 2008/0141132 A1 * | 6/2008 | Tsai ............ 715/716 |
| 2008/0244038 A1 | 10/2008 | Martinez |
| 2008/0313177 A1 * | 12/2008 | Li ............ G06F 17/30864 |

FOREIGN PATENT DOCUMENTS

| | | |
|---|---|---|
| WO | WO 2001001307 A2 * | 1/2001 |
| WO | WO 2004/028234 | 4/2004 |
| WO | WO 2005/065237 | 7/2005 |

OTHER PUBLICATIONS

Yahoo Privacy Center_Mar. 2004_pp. 1-87.*
Hall_Flickr User Upset Over Yahoo Ads on Photo Pages_Sep. 2005_pp. 1-6.*
Gehl_4 Ways to Get Advertisers on Your Site_Jul. 2006.*
Googles AdSense a bonanza for some Web sites_Mar. 2005.*
Inside AdSense_Stay on target_Jan. 2006.*
Korean Intellectual Property Office, (English Translation), Korean Patent Application No. 1020000020821, Publication No. 1020010097062A, 2 pages abstract, published Aug. 11, 2001.
PCT/US2007/087948, Written Opinion of the International Searching Authority, Korean Intellectual Property Office, Government Complex-Daejeon, 139 Seonsa-ro, Seo-gu, Daejeon 302-701, Republic of Korea, Apr. 28, 2008.
International Search Report for PCT/US2008/058502 dated Jul. 7, 2008.
Office Action for U.S. Appl. No. 11/694,638 dated Apr. 30, 2010.
Office Action for U.S. Appl. No. 11/541,092 dated Aug. 9, 2010.
Office Action for U.S. Appl. No. 11/694,638 dated Oct. 1, 2010.
Scott, Thomas, Smarter Image Hotlinking Prevention, published Jul. 13, 2004 in The Server Side, pp. 1-6, available at http://alistapart.com/article/hotlinking.
European Search Report 07869444.5 dated Oct. 7, 2011; 5 pages.

* cited by examiner

```
<html>
<head>
                                                            702
<script language="JavaScript"
src="http://ypn-js.yahoo.com /js/ypn.js">
</script>

</head>

<body>
                                                            704
..................

<div class="template class" id="template Id" . . . .

<script type="text/javascript">
   <!--
   if (!media_object) { getContentEmbedderId(name);
                        generateMediaLinks; }
   //-->
   </script>

<li> text </li>
</div>

..................

</body>
```

| <a href="http://www.yahoo.com/?adId=GHOHWF7140703"
title="Find out more!">Ad</a>

| <a href="http://www.yahoo.com/?redrct=www.eucproducts.com/?OVRAW=leaf%
20eucalyptus&OVKEY=eucalyptus%20leaf&OVMTC=standard";
CEEId=ceeid;title="Find out more!">Ad</a>

Fig. 9D 504
577

| <a href="http://www.yahoo.com/?CEEId=ceeid;NAHId=nahid;
redrct=www.eucproducts.com/?OVRAW=leaf%20eucalyptus&
OVKEY=eucalyptus%20leaf&OVMTC=standard;"
title="Find out more!">Ad</a>

Fig. 9E 504   570        576        569

| <a href="http://www.yahoo.com/?redrct=www.yahoo.ad.com/?
p=eucalyptus+leaf;CEEId=ceeid;"
title="Find out more!">Ad</a> 
568

Fig. 9F

506 \
| <a href="http://search.yahoo.com/search?CEEId=ceeid;    574
p=eucalyptus+leaf"; title="Search for this item...">Search...</a> |</p>

Fig. 9G

506 \
| <a href="http://search.yahoo.com/search?CEEId=ceeid;NAHId=nahid;    577
p=eucalyptus+leaf"; title="Search for this item...">Search...</a> |</p>

<a href="http://www.yahoo.com/?redrct=www.eucproducts.com/?
OVRAW=leaf%20eucalyptus&OVKEY=eucalyptus%20leaf&
OVMTC=standard" img width="380" border="0"
src="http://static.flickr.com/81/241933979_f838b26575.jpg?v=0"
style="margin: 0px;"/> </a>

Fig. 9I

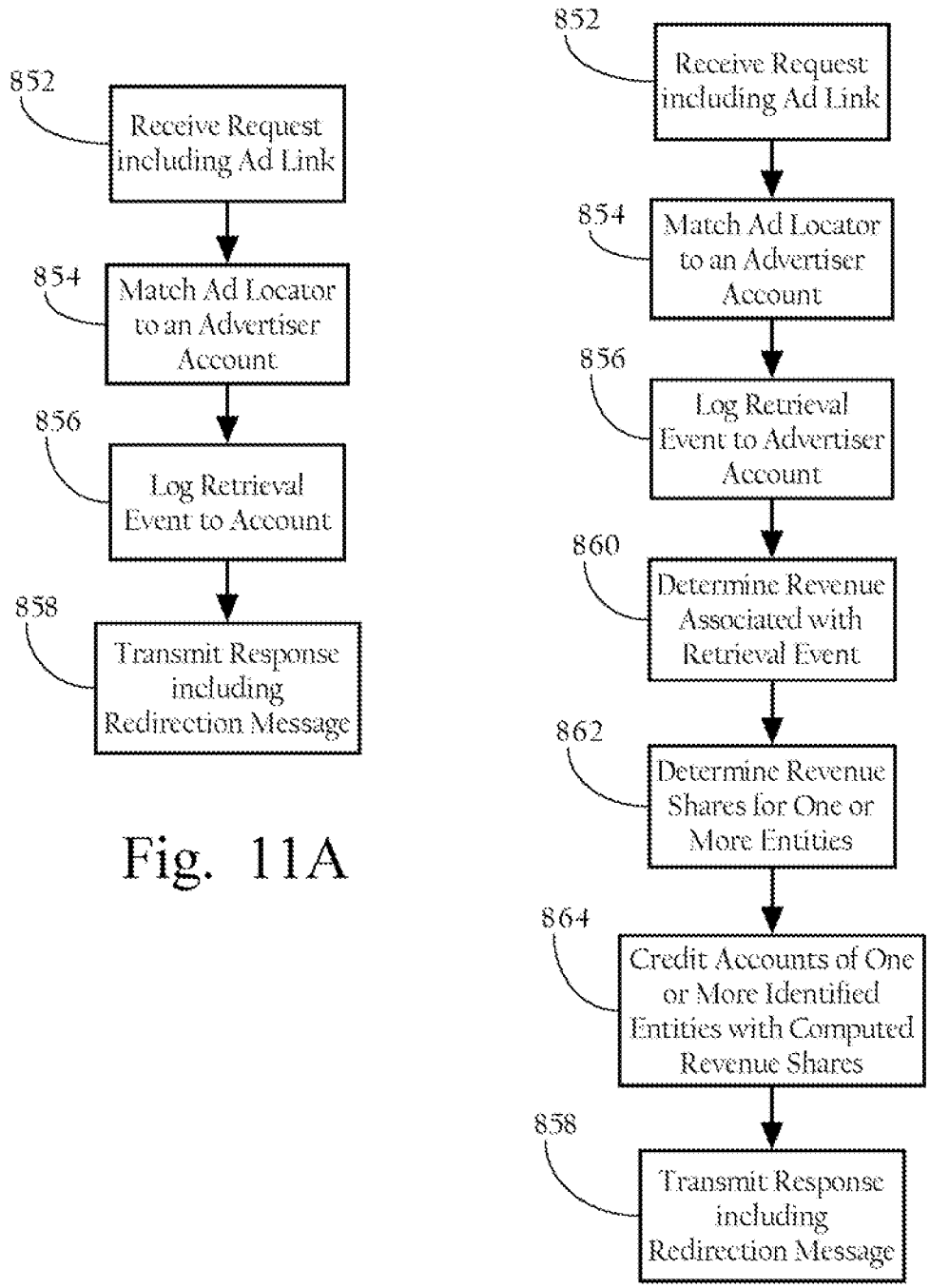

Fig. 13

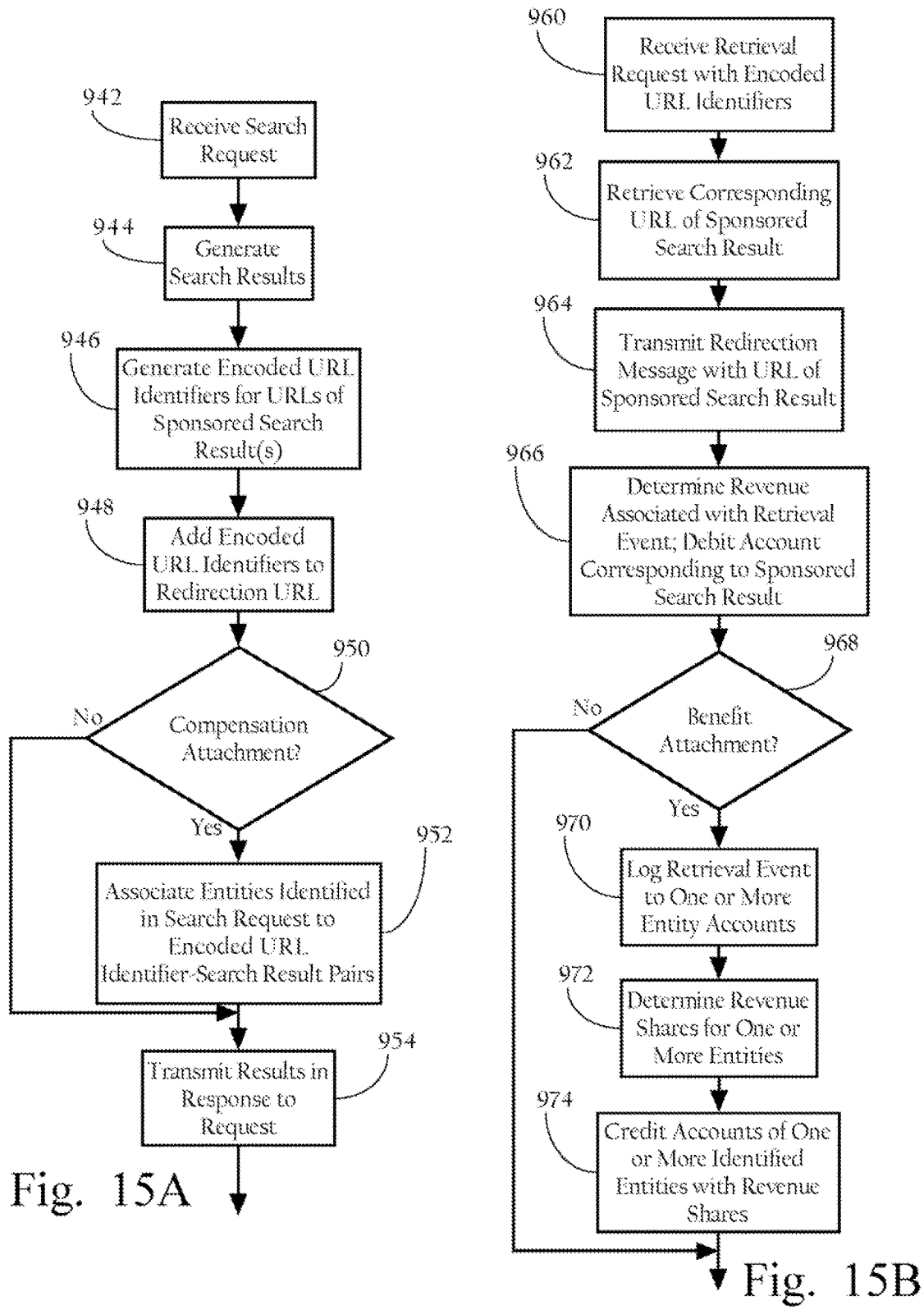

LINK RETROFITTING OF DIGITAL MEDIA OBJECTS

FIELD OF THE INVENTION

The present disclosure generally relates to use and distribution of digital media objects over computer networks.

BACKGROUND

Interactive systems connected wide area networks, such as the Internet, have steadily evolved into vibrant mediums for social interaction and sharing of digital media. Indeed, an enormous amount of digital media generated by end users, media companies, and professional media creators is made available and shared across the Internet through web sites and uploading to various content hosting or aggregation systems and services (e.g., Flickr®, Yahoo!(r) Video, YouTube.com, etc.). End-users increasingly use or share media in a variety of on-line and interactive contexts. For example, an ever-increasing number of end-users create websites of various types, including blog pages, personalized social networking pages (such as Yahoo! 360, Facebook, or MySpace), that utilize digital media content, such as images, video, and music. Furthermore, digital media content is often found posted to online groups or forums, or other purpose-built sites, such as for small businesses, clubs, and special interest groups.

These two dynamics are closely related in that online media available on the Internet is often re-used or included in the pages of web sites, social network sites, on-line forums, or other systems. For example, a user may create a blog about a topic of personal interest—e.g., beagles. When posting to the blog (creating a short text item), the user may include an image of a beagle that illustrates the point or subject of the post (e.g., beagle ear length). To locate an image, the user may access an image search engine and find a suitable image. To add the image to the blog post, the user may download that image to a hard drive or other data store, and then upload the image to the blog hosting site. Alternatively, if technically adept, the user may add HTML code to the blog post that will display the image in the post, causing the image to be loaded from its original location when the blog is viewed. Video and audio content may also be added to blogs or other network addressable resources, such as personal pages, in a similar manner.

SUMMARY

Particular embodiments of the present invention are related to a digital media link embedding mechanism for generating one or more links or digital media objects embedded in network resources, such as HyperText Markup Language (HTML) or extensible markup language (XML) pages. Particular implementations of the invention allow network application hosting sites, such as blogging sites and social networking or media sites, to automatically insert revenue generating and/or informational links in proximity to digital media objects embedded by users into personal pages, blog entries, on-line forum posts, and the like. In one implementation, analysis to generate the media links focuses on data surrounding a given digitial content object to improve the relevance, or descriptiveness, of the links. Such media-related ad or search links may be more perform ant (relative to clickthru rates), since the concepts or keywords used to generate the ad and or search are extracted from data surrounding the digital content.

DESCRIPTION OF THE DRAWING(S)

FIG. 5 illustrates example page template code according to a particular implementations of the invention.

Figure 8A:
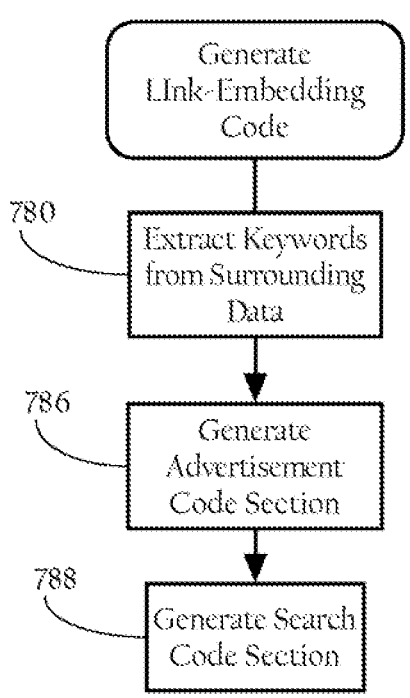
Figure 8B:
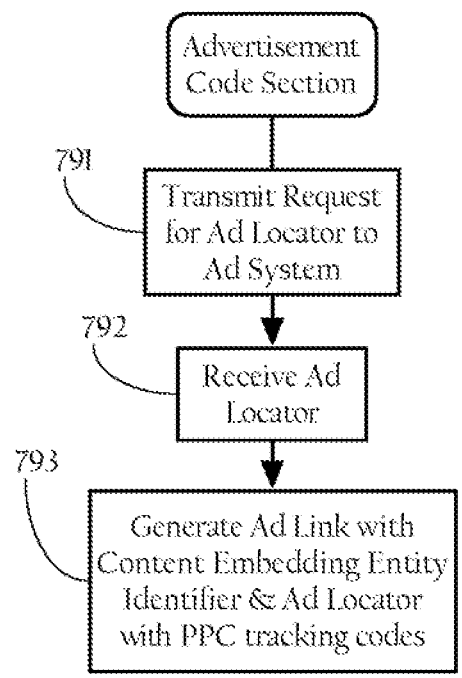

FIGS. 8A and 8B provide example methods, according to particular implementations, directed to generating link-embedding code.

FIGS. 9A thru 9I set forth example link-embedding code and code sections.

Figure 10:
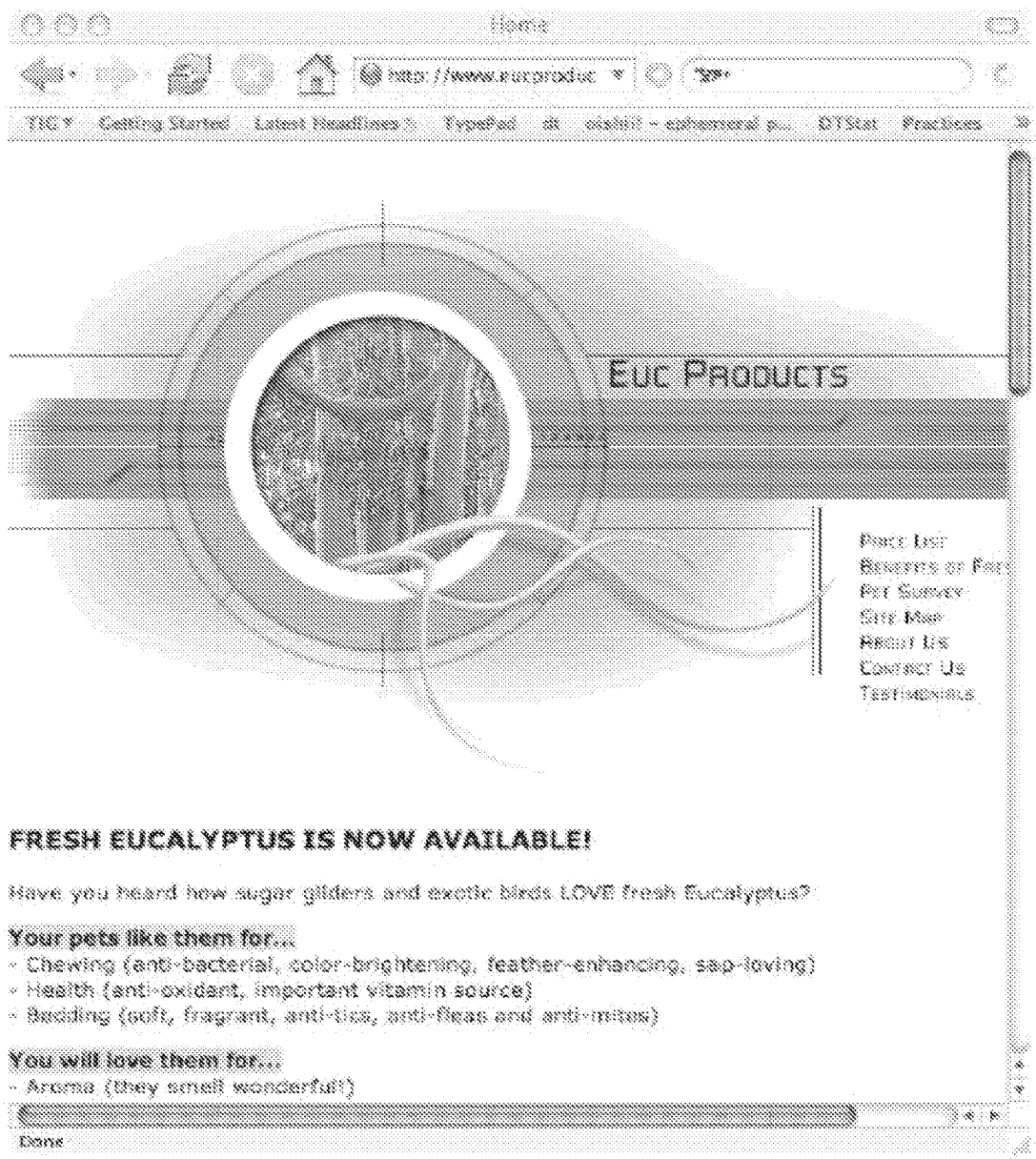

FIG. 10 illustrates an example web page including an advertisement.

Figure 11C:
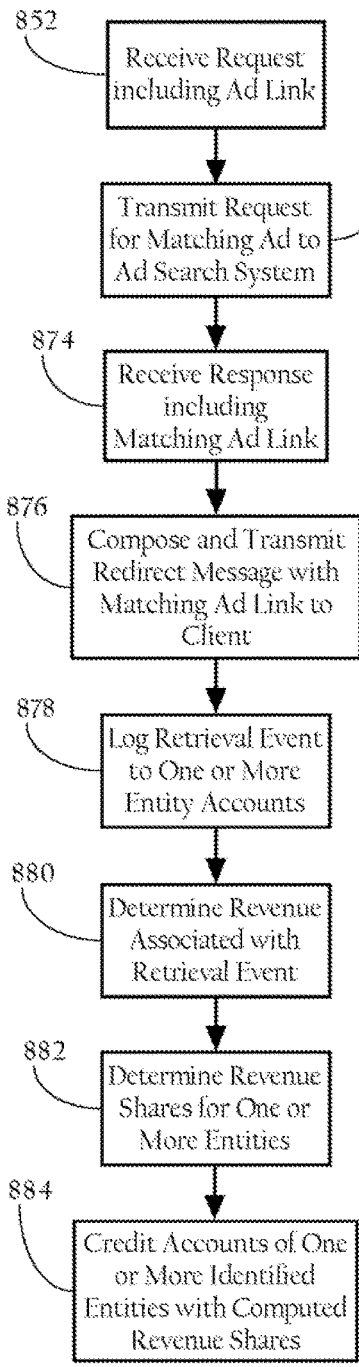

FIGS. 11A thru 11C illustrate example methods directed to processing requests involving ad links according to particular implementations.

Figure 12:
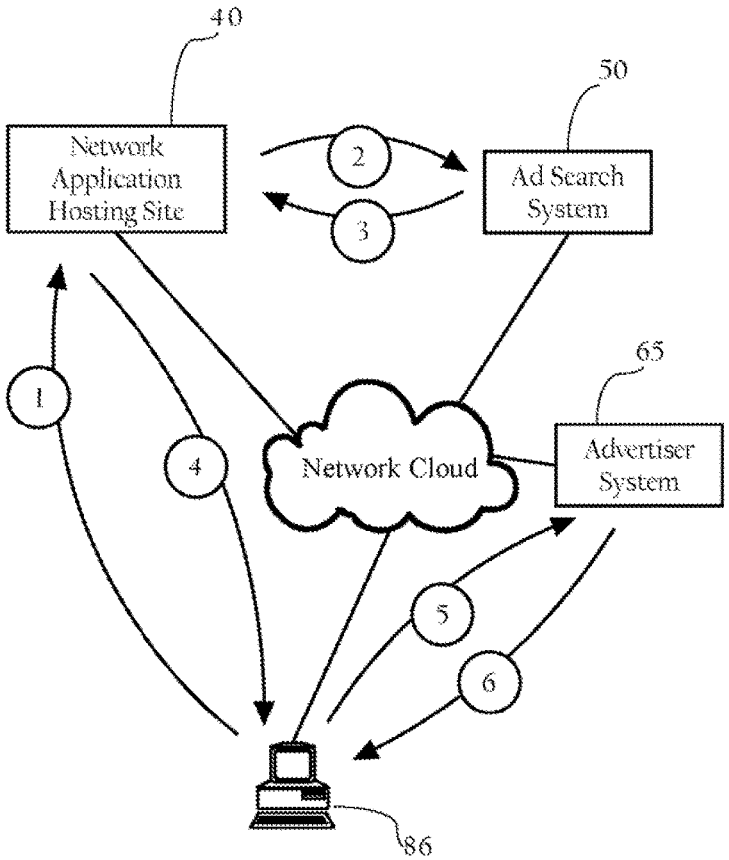

FIG. 12 is a schematic diagram illustrating an example message flow involving an ad link according to a particular implementation.

Figure 13:
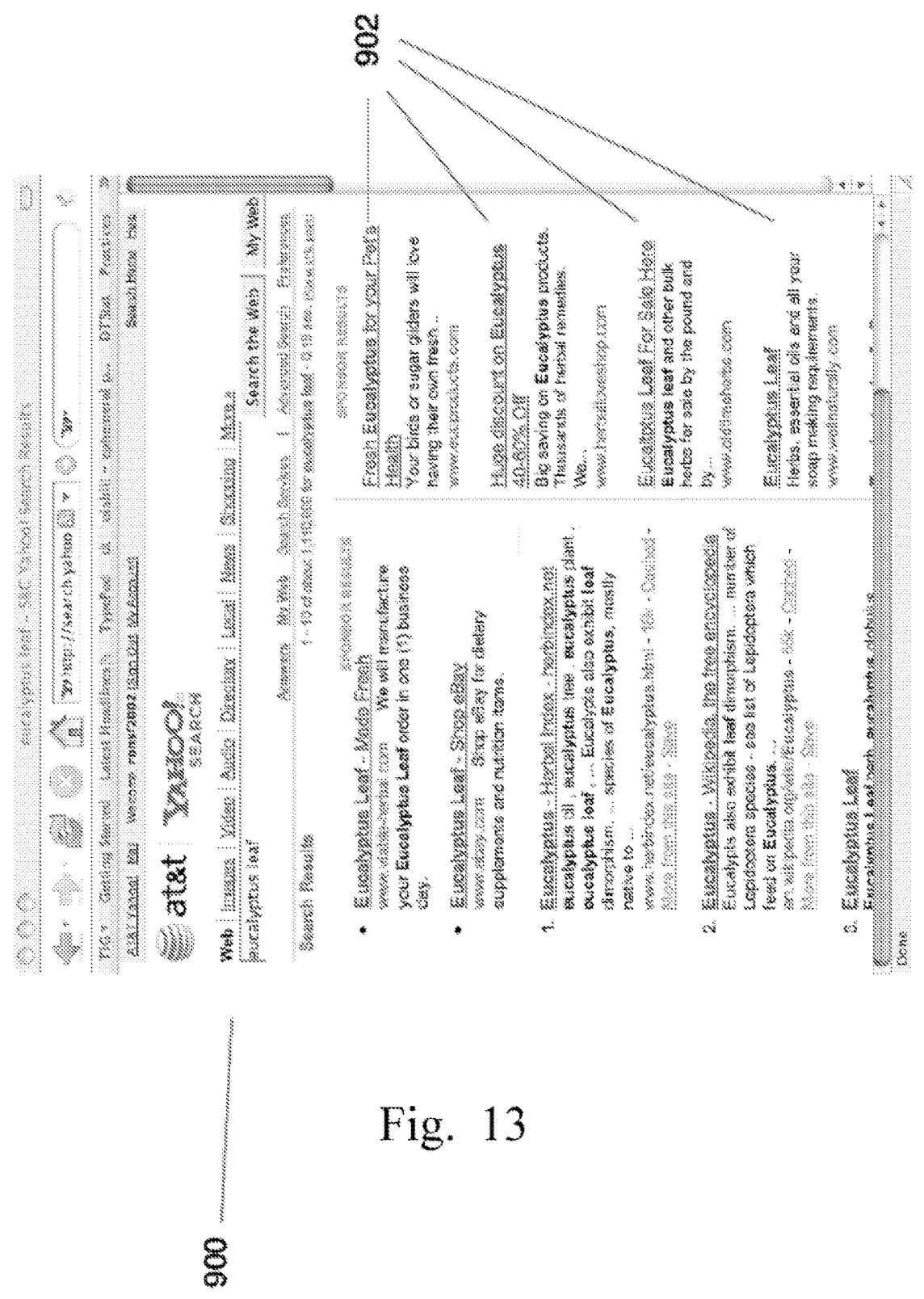
Figure 14:
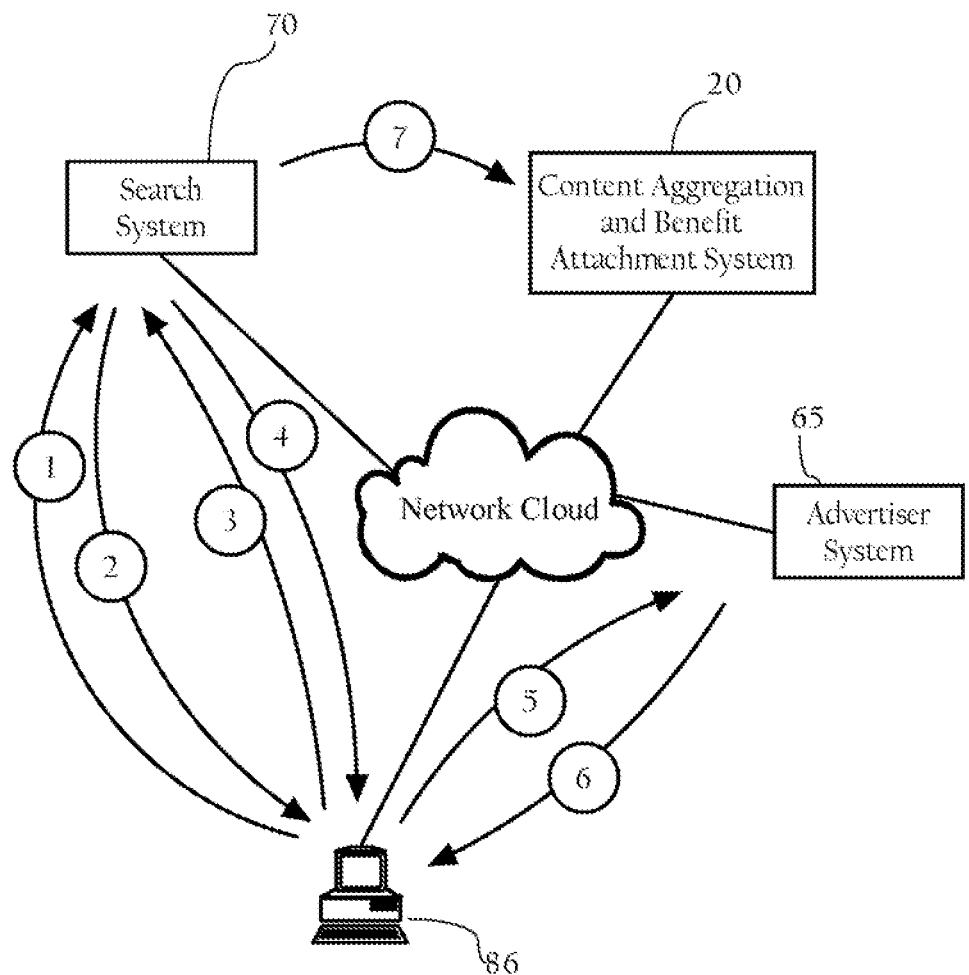

FIG. 13 is an example interface including search results,

FIG. 14 is a schematic diagram an example message flow involving a search link according to a particular implementation.

Figure 15C:
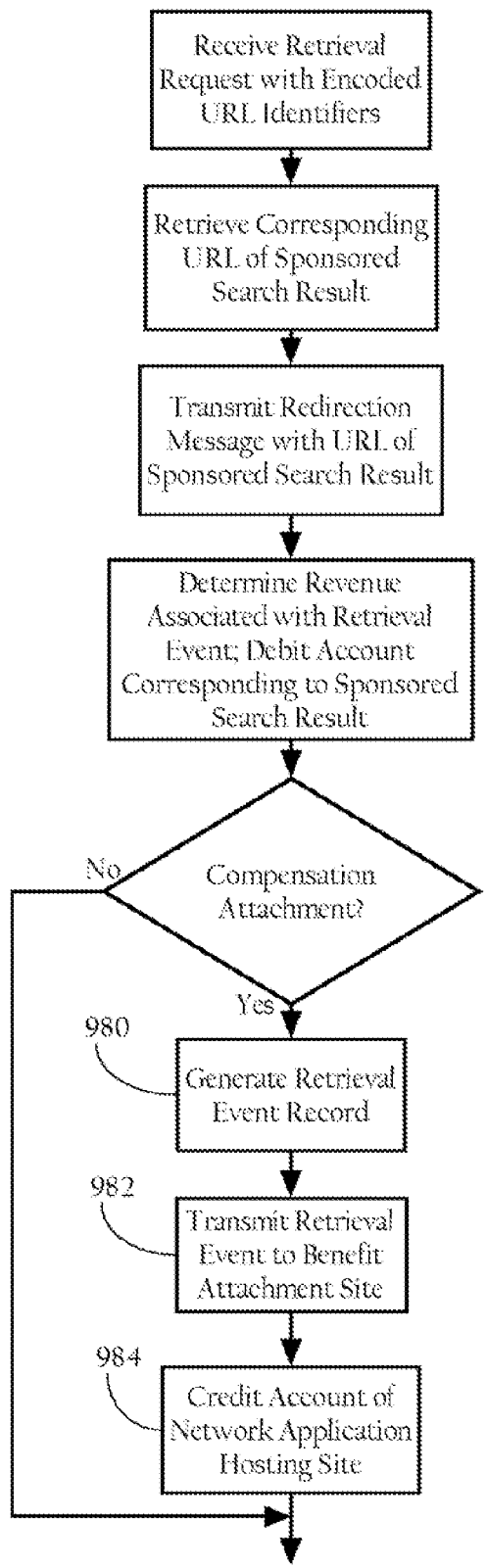

FIGS. 15A thru 15C illustrate example methods directed to processing requests involving search links according to particular implementations.

DESCRIPTION OF PREFERRED EMBODIMENT(S)

A. Overview

The present invention can be implemented in a variety of configurations. In some particular implementations, one or more of the following events or processes can occur. In some implementations, a user, such as a blogger or a user of a social networking site, may add a digital content object to a blog entry or personal page. The digital content object can be added by inserting the digital content object directly, or by adding content, embedding code including a URL to the digital content object. Typically, the user may add text in connection with the entry that contains the digital content object. As discussed in more detail below, a process may process the blog, personal page or other network resource to identify one or more sections in the resource. As to each section, the process may identify one or more digital, content objects in a section, and generate link embedding code containing one or more links based on information obtained from analysis of the data surrounding the digital content object. The generated link can be inserted in proximity to the digital content object.

In some implementations, the hyperlinks, when activated, are operative to generate revenue or some other benefit to one or more entities associated with use, distribution, hosting or creation of the content. Particular implementations provide for different hyperlink types that can be used independently or in combination, such as ad links, and search links. In one implementation, revenue generated by activation of one or more of these links (such as links to sponsored ads or content in search results) can be shared between one or more of content embedding entities, network application hosting service providers, search system providers, advertising system providers, or others. As discussed below, a variety of implementations are possible.

Particular implementations of the invention can be configured to achieve a variety of revenue models. Particular implementations of the invention provide novel revenue models that allow a vast array of social media systems, such as content aggregation sites, blogging sites, online forums, and social network sites, to monetize one or more aspects of their operations in manners not currently realized.

In the following description, specific details are set forth in order to provide a thorough understanding of particular implementations of the present invention. Other implementations of the invention may be practiced without some or all of specific details set forth below. In some instances, well known structures and/or processes have not been described in detail so that the present invention is not unnecessarily obscured.

A.1 Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 80 may include packet-based wide area networks (such as the Internet), private networks, wireless networks, satellite networks, cellular networks, paging networks, and the like.

As FIG. 1A illustrates, a particular implementation of the invention can operate in a network environment comprising network application hosting site 40, ad search system 50, advertiser system 65, and search system 70. Although FIG. 1A illustrates the foregoing systems as separate systems or domains, the functionality represented by each system may be combined or incorporated into other systems and domains. Furthermore, the functionality represented by each depicted system may be further separated. Still further, implementations of the invention may operate in network environments that include multiples of one or more of the individual systems and sites disclosed herein. In addition, other implementations may operate in network environments where one or more of the system described herein have been omitted. Ghent nodes 82, 84 are operably connected to the network environment via a network service provider or any other suitable means.

A.1a. Network Application Hosting Site

Figure 1:
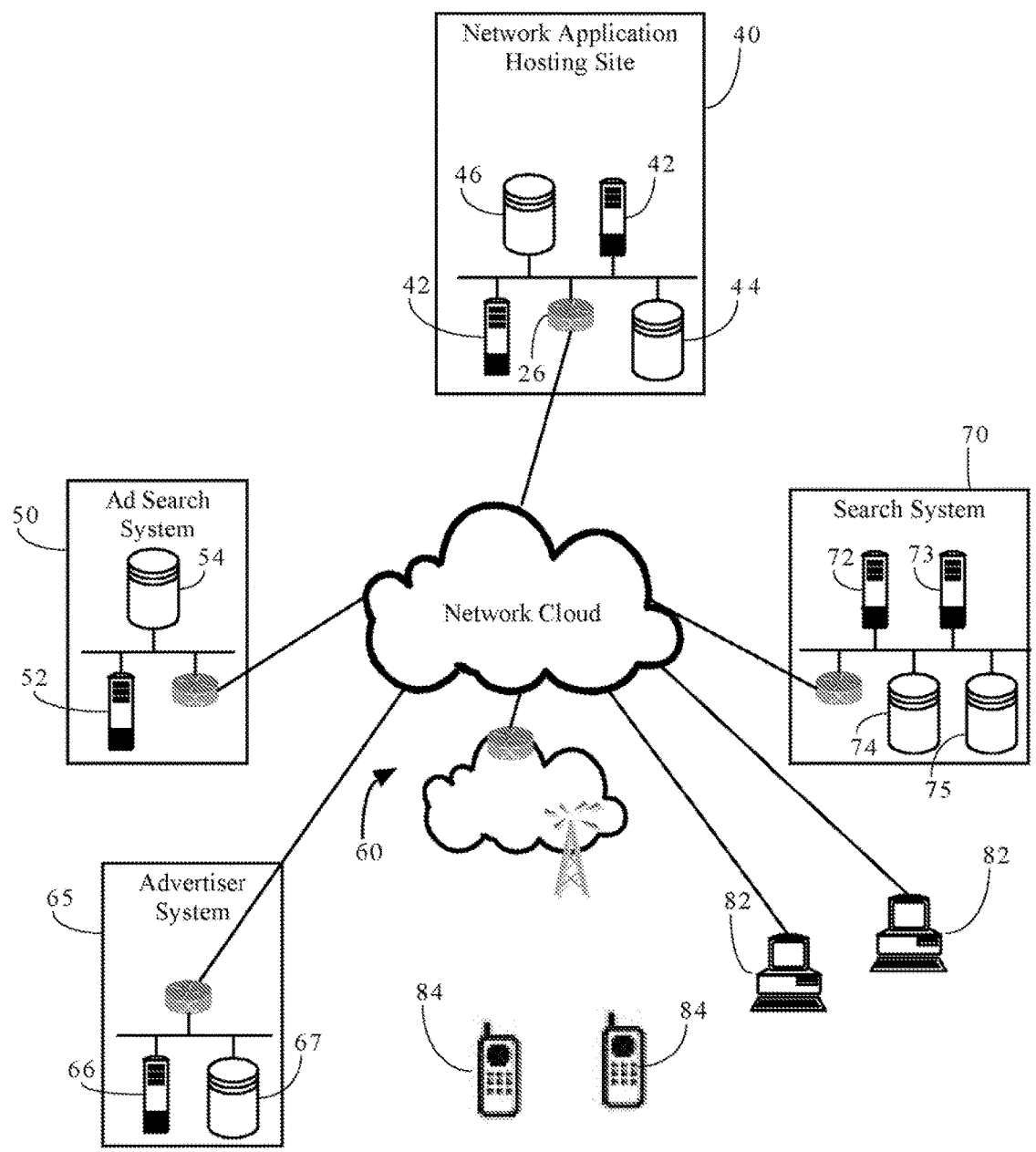
FIG. 1 illustrates an example network environment in which particular implementations may operate.

Network application hosting site 40 is a network addressable system that hosts a network application accessible to one or more users over a computer network. The network application may involve a web site where users request and receive identified web pages and other content over the computer network. The network application may be an on-line forum or blogging application where users may submit or otherwise configure content for display to other users. The network application may also be a social network application allowing users to configure and maintain personal web pages. The network application may also be a content distribution application, such as Yahoo! Music Engine®, Apple® iTunes®, podcasting servers, that displays available content, and transmits content to users. In other implementations, network application hosting site may be a media aggregation or sharing system, such as Flickr® photo sharing site, and similar variants, As FIG. 1 illustrates, network application hosting site 40 may comprise one or more physical servers 42 and one or more data stores, such as user data store 44 and template data store 46. The one or more physical servers 42 are operably connected to computer network 60 via a router 26. In some implementations, the one or more physical servers 42 host functionality that allows users to upload and retrieve content, post entries to personal pages or blogs, and the like. In one implementation, the functionality hosted by the one or more physical servers 42 may include web or HTTP servers, FTP servers, and the like. Physical servers 42 may support other process and message flows, as described below.

User data store 44 stores data submitted by one or more users. User data can include data a user has entered to configure a personal page on a social networking site, data entered by a plurality of users on an on-line forum, or data a user has entered on a blog. User data store 44, in one implementation, may also store media content as digital content data objects. A content data object or content object, in particular implementations, is an individual item of digital media information typically stored or embodied, in a data file or record. Content objects may take many forms, including: images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Template data store 46 stores one or more network resource templates, such as HTML or XML page templates. In one implementation, a physical server 42 may combine user data from user data store 44 and a template from template data store to create HTML pages in response to client requests. Structurally, user data store 44 and template data store 48 connote a large class of data storage and management systems. In particular implementations, user data store 44, for example, may be implemented by any suitable physical system including components, such as database servers, mass storage media, media library systems, and the like.

A.1.b. Search System

Search system 70 is a network addressable resource that provides search results responsive to queries transmitted from remote hosts. As discussed, herein, the search terms may be embodied in search links created in connection with link-embedding code. In particular implementations, search system 70 provides one or more links to sponsored content in search result listings. Search system 70, in some implementations, includes one or more physical servers 72, 73 and data stores 74, 75. Search system 70, in some implementations, includes at least two types of servers, where both types have HTTP, HTTPS, SSL, FTP, and/or other functionality that allows remote access over a network. A first server type may be an account management server 72. The account management server 72 operates in connection with account management data store 74. The account management data store 74 contains advertiser account information. General-purpose browsers or special-purpose client applications, running on client nodes 82, may be used to access advertiser account information stored in account management data store 74. An advertiser may, through account management server 72 and an account residing on the account management data store 74, participate in a competitive bidding process with other advertisers. An advertiser may bid on any number of search terms relevant, for example, to the content of the advertiser's web site.

A second server type may be a search engine server 73. A search engine server 73 executes one or more search engine programs that permit users, upon navigating to the search engine web server URL or sites on other web servers capable of submitting queries to the search engine server 73, to enter queries to search for network resources of interest. In a particular implementation, the search engine server 73 may generate a search result list that includes, at least in part, relevant entries obtained from and formatted by the results of a bidding process conducted in connection with the account management server 22. The search engine server 73 may generate a list of hypertext links to documents or other resources that contain information relevant to search terms entered by a user. The search engine server 73 transmits this list, in the form of a web page, to the network user, where it is displayed on a browser or other client application running on a client node 82, 84.

In particular implementations, search engine server 73 operates in connection with a search data store 74 including search listing records used to generate search results in response to user queries. In addition, search engine server 73 may also be connected to the account management server 72. One or more of the search listings, in some implementations, correspond to a search term-bid pairing and contains information to conduct the online competitive bidding process. In some implementations, each search listing comprises a search term, a web site description, a URL, a bid amount, and a title. The search term may comprise one or more keywords which may be common words in English (or any other language). Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding. The web site description may be a short textual description of the advertiser's web site and may be displayed as part of the advertiser's entry in a search result list. The search listing may also contain a title of the web site that may be displayed as the hyperlinked heading to the advertiser's entry in a search result list. The URL contains the Uniform Resource Locator address of the advertiser's web site. When the user clicks on the hyperlink provided in the advertiser's search result list entry, the URL is provided to the browser program. The browser program, in turn, accesses the advertiser's web site through the redirection mechanism discussed herein. The URL may also be displayed as part of the advertiser's entry in a search result list.

A bid amount may be a money amount hid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site.

Higher bids generally receive more advantageous placement on the search result list page generated by the search engine server 73 when a search using the search term bid on by the advertiser is executed. In a particular implementation, the amount bid by an advertiser comprises a money amount that is deducted from the account of the advertiser for each time the advertiser's web site is accessed via a hyperlink on the search result list page. A user "clicks" on the hyperlink with a computer input device to initiate a retrieval request to retrieve the information associated with the advertiser's hyperlink. In some implementations, each access or "click" on a search result list hyperlink is redirected to the search engine web server 73 to associate the "click" with the account identifier for an advertiser. This redirect action, in one implementation, accesses account identification information coded, into the search result link before accessing the advertiser's URL. The account identification information is recorded in the advertiser's account along with information from the retrieval request, as a retrieval request event. The information obtained through this mechanism matches an account, identifier with a URL and allows for account debit records to be maintained. Beyond Pay-Per-Click schemes, other monetization schemes are possible, such as Pay-Per-Impression, In particular implementations, the search result list also includes non-paid or non-sponsored listings that are not placed as a result of advertiser bids and are generated by an algorithmic search engine. In one implementation, the non-paid search result listings follow, or are provided adjacent to, the paid or sponsored advertiser listings on the search results page.

When a user accesses a search query page provided by the search engine server 73 and executes a search request, the search engine server 73, in one implementation, generates and displays a search result, list where the canonicalized entry in search term field of each search listing in the search result list matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query may have the same root but are not exactly the same (e.g., computing vs. computer). Alternatively a thesaurus database of synonyms may he used by the search engine server 24, so that matches may be generated for a search terra having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored in account management data store 74.

Search result list entries may also show the rank value of the advertiser's search listing. The rank value is an ordinal value, preferably a number, generated and assigned to the search listing by search engine server 73. In some implementations, the rank value is assigned through a process that establishes an association between the bid amount, the rank, and the search term of a search listing. The process gathers search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. In some Implementations, only the top N ranked search listings are provided in the first page of search results returned to the user.

In some implementations, the bidding process implemented by search system 70 may not distinguish between search queries submitted directly by users, and search queries resulting from activation of ad links contained in link-embedding code. In other implementations, search system 70 may support a separate bidding process for keywords contained in search queries resulting from activation of ad links in link-embedding code.

A.1.c. Ad Search System

Ad search system 50 is a network addressable system that is operative to select an ad in response to a request from a remote system, and return ad content or a URL to ad content. The ad search system may be a central system accessible to one or more systems over a wide area network, or a local system accessible to a single domain. In one implementation, ad search system 50 includes one or more physical servers 52 and an ad data store 54. In one implementation, ad data store 54 stores sponsored content information containing ad creative content, or uniform resource locators or identifiers to content or other resources hosted by one or more advertiser systems 65. In one implementation, the content is stored in association with a keyword index. Still further, the keyword index may include bid amounts or other suitable weighting values that may bias ad selection. In one implementation, ad search system 50 may select one or more matching ads in ad data store 54 based on one or more keywords or concepts extracted from a block of text.

In one implementation, ad search system 50 allows users to upload ad creative content, including display or banner ads and other multimedia, apply one or more policies or business rules directed to ad selection, specify one or more attributes of target, end users, and receive reports of ad usage, such as impressions, clicks and other interaction metrics.

A.1.d. Advertiser System

Advertiser system 65 is a network addressable system, such as a web site, corresponding to an advertiser or a hosting system that hosts ad or other content on behalf of one or more advertisers. In one implementation, advertiser system may comprise one or more physical servers 66 and a data store 67 storing data related to operation of advertiser system 65. For didactic purposes, advertiser system 65 may be run by a business enterprise to provide information concerning its products and services.

In addition, when accessed by a client application after activation of an ad link (for example), advertiser system 65 may provide a wide variety of information. For example, advertiser system 65 may provide a home page or other page near the top of a hierarchy of hypertext documents. In other implementations, advertiser system 65 may return ad creative content, such as a video, audio or still image. In yet other implementations, advertiser system 65 may present an order form directed to ordering a product or service. Advertiser system 65 may also provide coupons, such as discount coupons, that a user may print out and use.

A.1.e. Ghent Nodes

Client node is a computer or computing device including functionality for communicating over a computer network. A client node can be a desktop computer 82, laptop computer, as well as mobile devices 84, such as cellular telephones, personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client, applications may provide access to other pages or records when the user "clicks" on hyperlinks to other resources. In some implementations, such hyperlinks are located within the web pages and provide an automated way for the user to enter the DEL of another page and to retrieve that page. The pages or resources can be data records including as content plain textual information, or more complex digitally encoded multimedia content, such as software programs or other code objects, graphics, images, audio signals, videos, and so forth.

A.2. Example Protocol Environment

The networked systems described herein can communicate over the network 60 using any suitable communications protocols. For example, client nodes 82, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the Information transmitted between hosts may be formatted as HyperText Markup Language (HTML) documents. Other structured document languages or formats can be used, such as XML, and the like, In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client, request may cause a server to respond with a first data object, such as an HTML page, which itself refers to other data objects. A client application, such as a browser, will request these additional data objects as it parses or otherwise processes the first, data object, Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

Still further, in some implementations described below, the use of redirection messages is described. In particular implementations, redirection generally refers to transmitting a message from a server to a client application, for example, that causes the client application to access another server or resource without intervention or action by the end-user. Redirection can be accomplished in a number of different ways. For example, in connection with HTTP, redirection messages can be implemented using refresh meta tags, such as

```
<html><head>
<meta http-equiv="refresh" content="0; url=http://www.yahoo.com/">.
```

In addition, redirection messages can be implemented using HTTP refresh headers.

```
HTTP/1.1 200 ok
Refresh: 0; url=http://www.yahoo.com/
Content-type: text/html
Content-length: 78
Follow <a href="http://www.yahoo.com/">link</a>.
```

Redirection can also be accomplished by transmitting an HTML page including JavaScript code operative to accomplish redirection. Other suitable redirection methods can be used for other protocol environments.

A.2. Example Computing System Architectures

The client and server host systems described herein can be implemented in a wide array of computing systems and architectures. The following describes example computing architectures for didactic, rather than limiting, purposes.

A.2.a. Example Server System Architecture

FIG. 8 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DEAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

A.2.b. Example Client System Architectures

Figure 7:
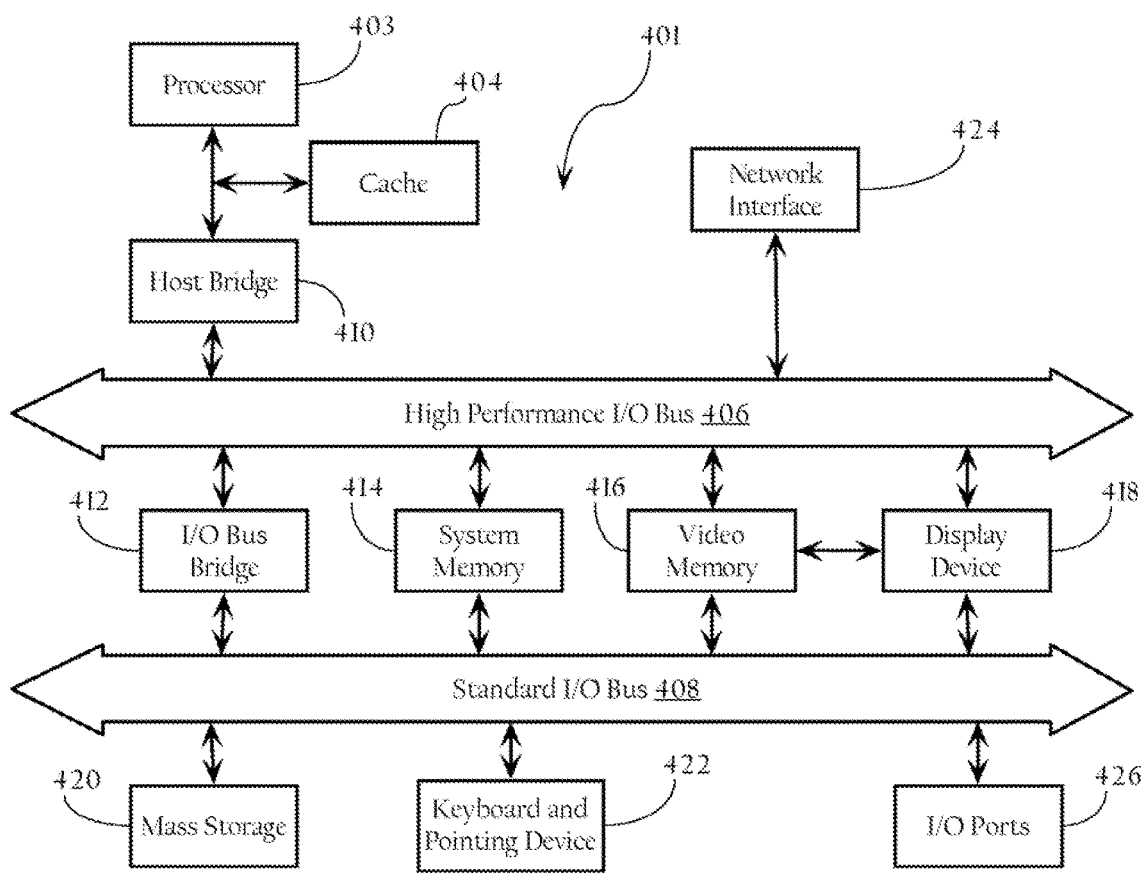
FIG. 7 is a schematic diagram, illustrating an example computing system architecture that may be used to implement one or more of client systems.

FIG. 7 illustrates an example hardware system 401, which may be used to implement a client node. In one embodiment, hardware system 401 includes a processor 403 and a cache memory 404 coupled to each other as shown. Additionally, hardware system 401 includes a high performance input/output (I/O) bus 406 and a standard I/O bus 408. A host bridge 410 couples processor 403 to high performance I/O bus 408, whereas an I/O bus bridge 412 couples the two buses 406 and 408 to each other. Hardware system 401 also includes a wireless network interface 424, a system memory 414, and a video memory 416 couple to bus 106. In turn, a display device 418 couples to video memory 416. A mass storage 420, a keyboard and pointing device 422, and I/O ports 428 couple to bus 408. Collectively, these elements are intended to represent a broad category of computer hardware systems, including but not limited to general purpose computer systems based on the Pentium® processor manufactured by Intel. Corporation of Santa Clara, Calif., as well as any other suitable processor.

The remaining elements of hardware system 401 are described below. In particular, network interface 424 provides communication between hardware system 401 and any of a wide range of wireline (e.g., Ethernet, etc.) or wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 403. I/O ports 426 are one or more serial and/or parallel communication ports that provide communication between additional peripheral devices, which may couple to hardware system 401.

Hardware system 401 may include a variety of system architectures; and various components of hardware system 401 may be rearranged. For example, cache 404 may be on-chip with processor 403. Alternatively, cache 404 and processor 402 may be packed together as a "processor module," with processor 403 being referred to as the "processor core." Furthermore, certain embodiments of the present invention may not require nor include all of the above components. For example, the peripheral devices shown coupled to standard I/O bus 408 may couple to high performance I/O bus 408. In addition, in some embodiments only a single bus may exist, with the components of hardware system 401 being coupled to the single bus. Furthermore, hardware system 401 may include additional components, such as additional processors, storage devices, or memories.

In one embodiment, the operations of client-side functionality are implemented as a series of software routines run by hardware system 401. These software routines may comprise a plurality or series of instructions to be executed by a processor in a hardware system, such as processor 403. Initially, the series of instructions may be stored on a storage device, such as mass storage 420. However, the series of instructions can be stored on any suitable storage medium, such as a diskette, CD-ROM, ROM, etc. Furthermore, the series of instructions need not be stored locally, and could be received, from a remote storage device, such as a server on a network, via network/communication interface 424. The instructions are copied from the storage device, such as mass storage 420, into memory 414 and then accessed and executed by processor 403. In some implementations, one or more aspects of the instructions may be implemented in hardware or firmware.

While FIG. 7 illustrates, for didactic purposes, the hardware architecture of a client according to one embodiment of the present invention, the client may, however, be implemented on a wide variety of computer system architectures, such as special purpose, hand held or portable devices, Personal Digital Assistants (e.g., converged devices which support WLAN data+voice), Laptop computers, hand-held phones, and the like. Still further, embodiments of the invention can operate in connection with other wireline hosts system, such as a desktop-based IP phone, and a laptop or desktop computer with, an Ethernet Network Interface Controller (NIC).

An operating system manages and controls the operation of hardware system 400, including the input and output of data to and from software applications (not shown). The operating system provides an interface, such as a graphical user interface (GUI), between the user and the software applications being executed on the system. According to one embodiment of the present, invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like, A.3. Example Participant Identification Particular embodiments of the present invention can involve multiple entities. For example, in one implementation, the link embedding mechanisms described herein may operate in connection with content embedding entities, network application hosting entities, and content consumers or end-users. An entity may be any suitable entity, such as an individual, a corporation, a partnership, a joint venture, and combinations of the foregoing. As described in more detail below, particular implementations operate to provide a benefit to one or more of the entities described herein based on dissemination of uploaded content over the network environment. In particular implementations, the benefit provided to one or more entities may be a monetary benefit, such as a share of revenues resulting from activation of a link in content-embedding code. The benefit may also be points in an account that may be redeemed for awards, such as travel and merchandise. In some implementations, the benefits provided to one or more entities may differ. For example, for a given link activation, one entity may receive a monetary benefit, while another may receive redeemable points or credits.

A content embedding entity is an entity that uses a digital content object, such, as by embedding the content in other underlying digital content accessible over a network, such as a blog or on-line forum post, a web page, or other network accessible content. In some implementations, a content embedding entity may be compensated as a result of third party activity, such as link activation, related to the content, that has been embedded.

A network application hosting entity is an entity that operates or hosts a network application, such as a web site, blogging site, a social networking site (e.g., MySpace.com, Yahoo 360, and the like), or a web page hosting service. In some implementations, a single entity may be a content embedding entity and a network application hosting entity.

A content consumer or end-user, in some implementations, is an entity that accesses network application hosting system 40 using a client node. One or more activities of content consumers, such, as viewing embedded content and activating one or more links associated with the content, may result in compensation to one or more entities based, on their respective roles relative to a given content item. Compensation, in some implementations, refers to a benefit, such as money, items, services, credits or points (redeemable for money, items, services, and the like) or any other benefit provided by one entity to another. In some particular implementations, one or more entities may share in revenues realized as a result of clickstream and/or purchase activity of a content consumer.

B. Link Retrofitting of Digital Content Objects

The link retrofitting operations described herein can be implemented in a variety of manners. For example, as discussed in more detail below, the link retrofitting operations can be implemented in a batch basis to retrofit digital content objects of one or more exising web pages or other resources. For example, a process can crawl a data store of web pages and retrofit digital content objects, found in the pages, with media links. The media links generated, and inserted, in the media can be statically defined. In other implementations, the link retrofitting operations can be implemented in a dynamic process configuration. For example, a link retrofitting code, such as Javascript, can be added to static HTML pages or HTML page templates. The link retrofitting code, when executed, can scan various sections of the underlying HTML page for media objects and data surrounding the media objects, and generate link-embedding code for insertion adjacent to the media objects. In other implementations, the link retrofitting code can operate as a server-side process that dynamically generates link embedding code, (or dynamically generates embedded links. In other word, server side processes such as those in Java Server Pages (.jsp) or Active Server Pages (.asp) execute at the time the page is generated, and construct pages with links embedded, as opposed to embedding code which will in turn embed links.

B.1. Embedding of Digital Content Objects

In a particular implementation, a user may access network application hosting site 40 over computer network 60 with a client node to configure a network resource, such as a web site page, a blog or personal page. For didactic purposes, an implementation of the invention is described as operating in connection with a network blogging application. For example, a user may access network application hosting site 40 to access an account, and post a blog entry. In connection with the post, the user may enter text and also insert a digital content object, such as an image, video clip, or an audio clip. In one Implementation, a special-purpose client application may be used to interact with network application hosting site 40. In another implementation, client computer 82 includes a browser or other client application that parses and displays Hyper-Text Markup Language (HTML) pages transmitted from network application hosting site 40.

Some sites, in connection with hosting and displaying content, provide content-embedding code in a field on a page displaying the content. When configuring a blog post, a user may paste the HTML code copied from the embed field into the HTML code of the blog page. In one implementation, network application hosting site 40 provides an entry or configuration interface that includes an "edit HTML" control that allows a user to directly edit the HTML code of the blog post. When parsed by a browser or other client application, for instance, the content-embedding code causes the browser to retrieve the content and display it. The content-embedding code may be incorporated into a variety of systems, such as information systems, and social networking systems. Indeed, a blog post represents one of many possible forms of social media in connection with which content-embedding code can be used. For example, the content-embedding code may be incorporated into personal pages on social networking sites, such as MySpace.com, Facebook. Yahoo! 360, and the like. The content-embedding code may also be used by a content-embedding entity in other contexts. For example, the content-embedding code may be entered into a thread on a public forum site. For example, a content-embedding entity may find an image of an automobile on a content site. The content-embedding entity may then incorporate the image by pasting the content-embedding code into a post on a public automobile forum. In other implementations, the content object itself (as opposed to a URL) can be inserted directly into the post.

Figure 2:
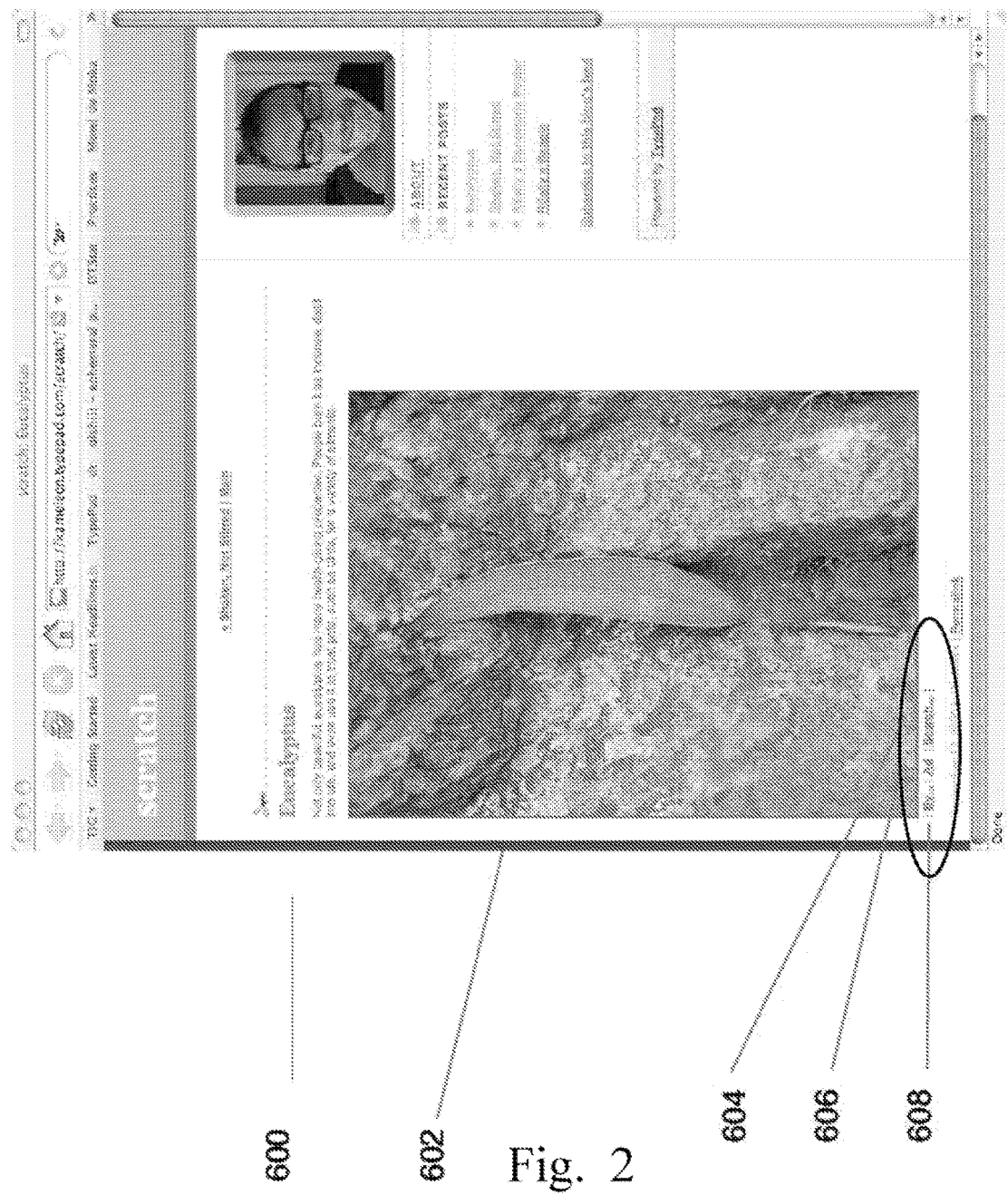
FIG. 2 illustrates an example user interface of a network application hosting site.

FIG. 2 illustrates an example blog page 600 including embedded content (here, image 602), In posting the illustrated blog, the content-embedding entity (here, a blog poster) has entered written text and the content-embedding code that causes selected content 602 to be displayed. As FIG. 2 illustrates, the blog page 600 includes advertisement and search locators as hypertext links 606 and 608, respectively. These links can be generated and inserted into the blog as described in more detail below.

In some implementations, to generate a blog or other page, network application hosting site 40 may rely on one or more page templates that define the basic layout and configuration of a page. Often, a server dynamically constructs a requested page by combining data from a data store with a page template. As discussed in more detail below, particular implementations of the invention can utilize scripts or other code modules, inserted at one or more points in the template, to generate link embedding code. Still further, network application hosting site 40 may maintain user accounts to track the content embedding entities, and potentially include corresponding entity identifiers in link-embedding code (see below).

B.2. Link Embedding Code Operations

Figures 3, 4:
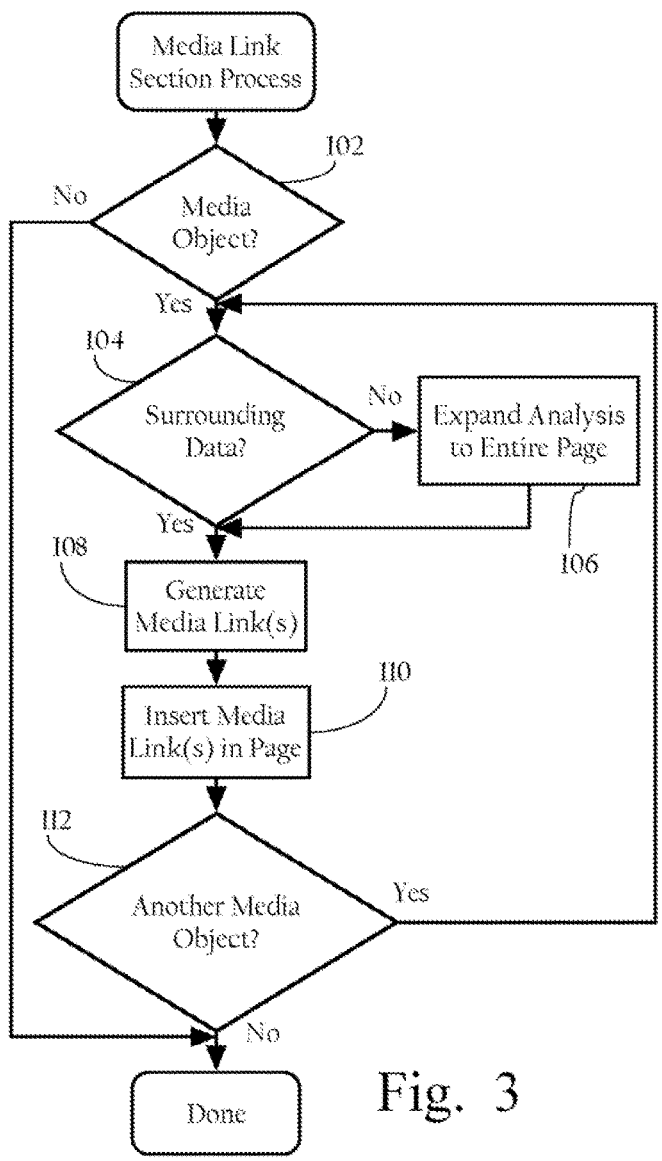
FIG. 3 illustrates an example method, according to particular implementations of the invention.
FIG. 4 illustrates another example method, according to particular implementations of the invention.

FIG. 3 illustrates a process, according to one implementation of the invention, directed to creating and inserting one or more links into a given section of underlying content in response to identifying one or more digital content objects. The illustrated process can operate within a section of a structured document or page. For HTML pages, a section can be defined by <div> tags or elements. Sections may also be defined based on a combination of structured document tags or elements. Restricting the analysis to data surrounding a given digital content object improves the chance that the analysis focuses on data relevant to, and/or descriptive of, the digital content object. Such media-related ad or search links may be more perform ant (relative to clickthru rates), since the concepts or keywords used to generate the ad and or search are extracted from content surrounding the digital content. In one implementation, the process can be implemented by a script or other embedded code module embedded within an HTML page and operative within the context of a browsing application. As discussed in more detail below, the process illustrated below can operate in a variety of contexts.

In the implementation shown in FIG. 3, the process scans the section for the presence of a digital content object (102). In one implementation, the process may scan the HTML or other code defining the section for the presence of URLs having common file name extensions that correspond to media files, such as *.jpeg, *.gif, *.mp3, *.m.ov, etc., as well as file names of executable files corresponding to media players. In other implementations, the process (when implemented as Javascript) may access the document object, model of the underlying page to identify whether a given section includes a digital content object. If a digital content object is found, the process scans the section for any surrounding data (104). Surrounding data can include text entered by a user within a section. For example, the text entered by a user in a blog or forum post is often contained within a <div> and can be analyzed. In addition, surrounding data can also include section titles and other identifying attributes in the code defining the document. If no surrounding data is found within the section that contains the digital content object, the process expands the search to the entire underlying document for text (106).

Based, on the identified text, the process then generates link embedding code including one or more media links for the digital content object (108), and inserts the link embedding code such that the media links will be displayed in proximity to the digital content object, when rendered by a browser or other client application (110). Generation of link-embedding code is described in more detail below. As FIG. 2 illustrates, the media links can be inserted adjacently below or above the display of the digital content object. In other implementations, one or more of the media links can be rendered laterally adjacent, to the digital content object. If the current section contains another digital content object (112), the process may repeat one or more of the foregoing operations. Otherwise, the process may proceed to another section of the document.

As discussed above, network application hosting site 40 may rely on various templates to construct HTML or other pages provided to client nodes. In one implementation, link-embedding code can be strategically placed in one or more locations in the page template to generate media links for one or more identified digital content objects.

Link-embedding code may take many forms. For example, content-embedding code may be source code, such as HTML code, or object code. Content-embedding code may also include one or more scripts, such as JavaScript, expressing functions that are embedded in or included from HTML code. These script functions can interact with the Document Object Model (DOM) of the page to perform one or more tasks. Scripts may also be used to make calls to remote servers after an HTML page has loaded. These calls can obtain new information or data, which additional script code can merge with the DOM of the existing page so that it is displayed or otherwise rendered.

For example, the script may access the DOM of the underlying HTML page to extract and process information. For example, the script may process the data of a given section in an underlying HTML page to extract one or more keywords or other data that may be useful, for example, in ad selection or keyword extraction for a search system. In some embodiments, the script could process the data of the HTML page, filtering out extraneous information such as "the", "a", "and", and the like, and transmit this information in as contextual information, when querying ad search system 50 for a banner ad, sponsored content link, and the like.

Another way to detect more information in an underlying content object is to read the meta tags in an automated way. The meta tags are well-structured and may provide additional information about the digital content object. For example, a meta tag may include <meta name-"keywords" content photography, digital photography, camera phones, camera>. For example, page-scraping mechanisms and semantic technologies can be used to understand the theme of the section. These meta keywords as provided by the user would be a valuable and direct relation to understand the theme of the image or other object embedded by the user. Using this information, a semantic engine may select, one or more relevant-topics from a dictionary, and may select one or more relevant sponsored links for these topics from search system 70, or creative ad content from ad search system 50. In addition, search system. 70, or ad search system 50, may employ a categorization tool to understand the categories based on extracted information. Categories can map to a set of keywords. For example, the keyword "photography" may map to a category, entitled "Arts & Photography." Relevant ads for this category could be selected by ad search system 50.

FIG. 5 illustrates, redacted for clarity and didactic purposes, certain elements of a page template. In the implementation shown, the header section of the page template may contain a script, or calls 702 to retrieve a script, that dynamically generates one or more aspects of the links provided when the embedded content is displayed. In the implementation shown, the page template may also include a section template 704 denoted by <div> elements. In a blog entry for example, a server may replicate the section template 704 for each blog entry to be rendered in a given page. As FIG. 5 illustrates, the page template may include script sections including calls to the named functions of the script, originally identified in the header section. For example, in the implementation shown, the script can include a code section (get ContentEmbedderId) operative to retrieve an identifier of the entity that embedded the content, such as a blogger or social networking site account user. These script sections can be configured to implement the process illustrated in FIG. 3 above. Including script code sections in the section templates obviates the need to explicitly identify the sections of a page or other resource, since the server side process replicates each section template as necessary, resulting in the script code sections making one or more function calls to the underlying script embedded in the page, As discussed below, however, the sections of a page can be explicitly identified based on identification of <div> or other suitable elements or tags of a structured document. FIG. 4 illustrates a process according to one implementation of the invention, which identifies one or more sections of a document, and executes the process illustrated in FIG. 3 as to each identified section. The process illustrated in FIG. 4 can be implemented in a variety of contexts. For example, the process of FIG. 4 can be executed by a backend, batch process on a data store of web pages, by a script executing within the context of a browser application, or a code module or script executing on a web server. The process of FIG. 4 can also be implemented by a network appliance, proxy or other network device disposed in the communications path between a network application hosting site and one or more client nodes.

In the particular implementation shown, a script or other code module can identify a content embedding entity identifier (see above) (202), and one or more sections of a document (204). The script can then execute the process illustrated in FIG. 3 to generate link, embedding code for one or more media objects in each section (206, 208). As discussed in more detail below, the content embedding entity identifier can be incorporated in one or more of the links inserted proximally to the digital content objects.

Still further, the processes described herein can be optionally augmented to perform various checks to determine whether generating link embedding code is desirable. For example, if the formatting parameters (such as size parameters) associated with the content object are below a threshold size (e.g., indicating a thumbnail image or icon, for example), the process may optionally omit generation of link embedding code. In another implementation, the process may also recompute one or more formatting parameters to ensure that the content, object, when displayed in connection with the links, is formatted properly relative to the underlying HTML page.

B.2.a. Media Links and Link Generation

As discussed above, a process, such as a script, will process data surrounding a digital content object and generate one or more media, links to be inserted adjacent to the digital content object, when rendered. In one implementation, when the link-embedding code is inserted into an HTML document and subsequently accessed by a client application, the client application may retrieve and execute the script. The script may, using the parameter values in the link embedding code, may make calls to one or more remote servers to retrieve and render the content, as well as generate one or more of the links described herein. For example, the script, when executed, may cause the client application to query ad search system 50 for an ad URL, and then render the identified content as a clickable region that, when clicked, resolves to the ad URL.

FIGS. 8A and 8R illustrate example methods for generating link-embedding code according to one possible implementation of the invention. As FIG. 8A shows, the process, embodied in a script or other module, can extract one or more keywords from the data surrounding the digital content object (780), and use this data to generate one or more aspects of the link-embedding code. The process can then generate an advertisement code section 504 (786), and/or a search code section 506 (788).

Figures 9A, 9B:
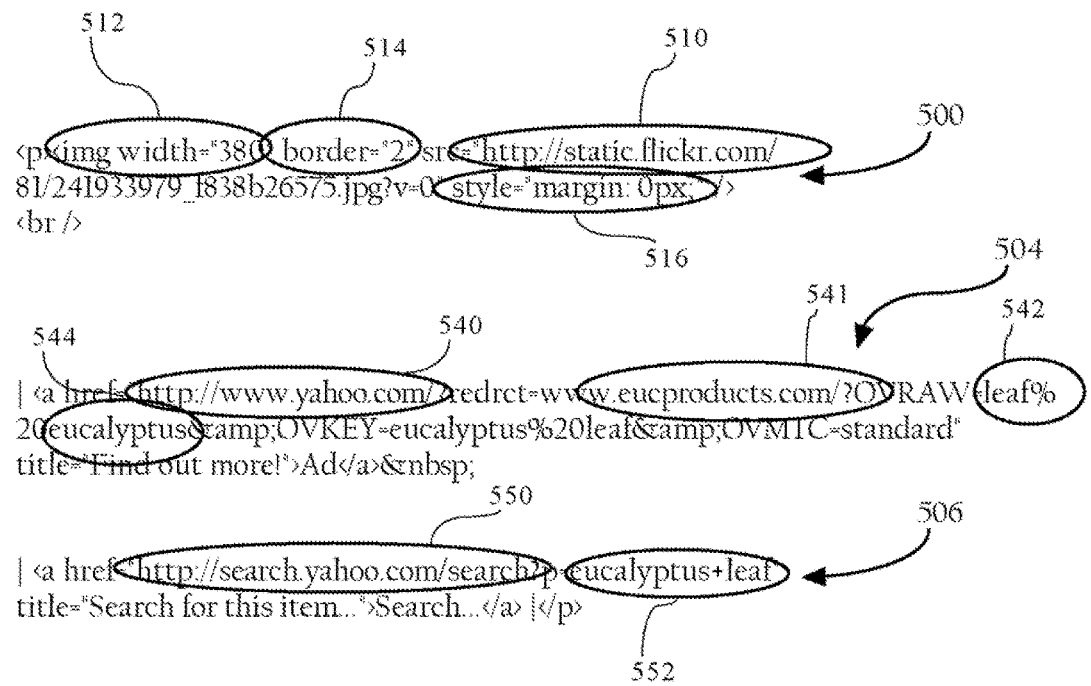

As FIG. 8B illustrates, to generate an advertisement code section 504, the process may transmit a request, including one or more of the extracted keywords, to an ad search system 50 (791). The process may receive from the ad search system 50 a response containing an ad locator including a URL to an advertisement (792). The process then generates an advertisement link, in one implementation, with the identifier of the content embedding entity and the ad locator (793). In the implementation shown, the ad locator may include FPC codes (see FIG. 9A). To compose a search code section 506, server 22 may generate a search link, in one implementation, with the identifier of the content embedding entity and a search locator including one or more keyword or terms extracted from the surrounding data FIGS. 9A and 9B illustrate the elements of an example link-embedding code according to one particular implementation of the invention. In the implementation shown, the link embedding code 504, 506 can be inserted in proximity to a content-embedding code section 500. The link-embedding code may comprise an advertisement code section 504 and a search code section 506. Content code section 500 includes a content locator 510, such as a URL corresponding to the content to be embedded. The content locator 510 may include a URL of the system that hosts the content. Content code section 500 may also comprise formatting or other information. For example, tags 512, 514, and 516 indicate the width, border and style to be used when displaying the content. One or more of the resource locators or indicators in the content embedding code may be formatted as hypertext links, which can be activated by a user click.

Advertisement, code section 504 includes an advertisement locator 540, which when activated causes an advertisement to be displayed. The advertisement locator may take a variety of forms. For example, the advertisement locator may be a fixed or static URL that, when activated, causes a browser or other page-consuming client application to transmit a request to a network addressable resource, such as a web server, and receive an advertisement. In one implementation, the advertisement locator may be embodied in a hypertext link including the URL 540 of network application hosting site, and a static URL 541 corresponding to an advertisement in a Common Gateway Interface (CGI) command. When the advertisement link is activated, the client application transmits a request to network application hosting site 40, which transmits a redirection message to the browser.

In the particular implementation shown, the advertisement locator 540 comprises a URL of network application hosting site (www.yahoo.com) and includes as parameters the URL 541 corresponding to an ad providing resource, such as a web server of a sponsoring advertiser. The advertisement link may include one or more of the extracted keywords 542 and 544 associated with the content in the form of Pay-Per-Click tracking parameters allowing the sponsoring enterprise to log usage. In the implementation shown, when the advertisement link, is activated, the client application transmits a request, to network application hosting site 40 (www.yahoo.com), which transmits a redirection message to the client application. The redirection message redirects the client application to the network resource identified in the "redrct" parameter field (See Ref. No. 541 of FIG. 9B). The use of redirection messages allows network application hosting site 40 to track content and link usage. Other implementations are possible. For example, as FIG. 9O illustrates, the advertisement locator may include an ad identifier 573 that maps to a statically defined URL of an ad providing system.

Figure 6:
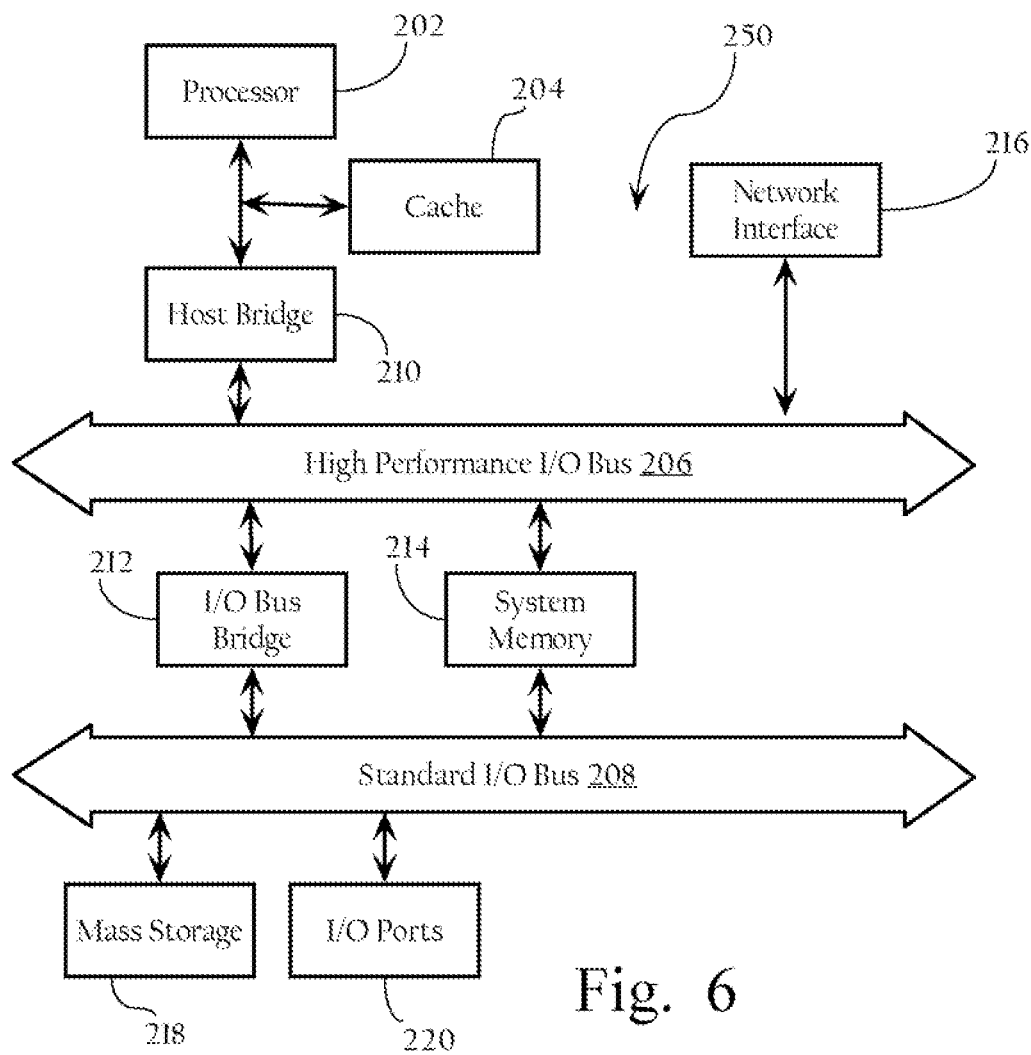
FIG. 6 is a schematic diagram illustrating an example computing system architecture that may be used to implement one or more of physical servers.

As FIG. 9D illustrates, the advertisement code section 504 may also include one or more identifiers each corresponding to a different user or entity. For example, the advertisement code section 504 may include a user identifier 574 corresponding to the content embedding entity that embedded the content in an underlying resource, such as a blog page, web site, personal page, and the like. Further, as FIG. 6E illustrates, the advertisement code section 504 may also include an identifier 577 corresponding to the network application host site 40 that hosts the resource into which the content has been embedded, such as a blogging site, social networking site (e.g., MySpace.com, Yahoo! 360, etc.), etc. As discussed in more detail below, one or more of these identifiers may be used in connection with compensating entities for activations of the ad fink.

In some implementations, the ad providing resource may be dynamically defined when the advertisement link is activated. For example, as FIG. 9F illustrates, the advertisement locator 570 may include a redirection parameter 576 including an identifier 569 of an ad search system and one or more key words 568. In the implementation shown, when the advertisement link is activated, the client application transmits a request to network application hosting site 40 (www.yahoo.com), which transmits a redirection message to the client application. The redirection message redirects the client application to the network resource identified In the "redrct." parameter field—here, an ad search system (www.yahoo.ad.com)—, passing one or more keywords, and optionally a content embedding entity identifier and/or a content, owner identifier. The ad search system can then use the keywords to select one or more ads to return to the client application. In some implementations, a browser cookie (including user identifying information) may also be passed with the request to the ad search system. The ad search system may use this information or related information to aid in ad selection. In some implementations, the ad search system may transmit a redirection message that causes the client, application to access a remote advertiser system.

The advertisement locator may be a URL or URI containing one or more parameters 542, 544 used in an advertisement selection process when submitted to an advertiser system 65 or an ad search system 50. In particular embodiments, the advertisement selection process may, for example, look up the key words—or tags—associated with the request and find an advertisement that matches the key words or tags. The ad system may transmit, the dynamically selected ad in response to a request, when the advertisement locator is activated. Note that the process of selecting the ad could use a variety of rules or mechanisms to determine which ad to show, such as a real-time auction mechanism, a stated, static highest bidder, a routing to a URL as set recently by the advertiser, and so on.

As FIGS. 9A and 9B show, the search code section 506 may also include a search locator 550 operative, when activated, to provide search results related to the content. The search locator may comprise a URL of a search system 70 and one or more keywords 552, such as the keywords extracted from analysis of the data surrounding a digital content object. Activation of the search locator, such as clicking on a hypertext link, may result in a page of search results. The search results may include one or more links to sponsored content or paid search marketing ads in addition to, or in lieu of, algorithmic search results.

The search code section 506 may also include one or more of the entity identifiers discussed above (e.g., content embedding entity, network application host, etc.) to be used in a compensation mechanism. For example, as FIG. 9G illustrates, the search code section 506 may include an identifier 574 of the content embedding entity, who may share in the resulting revenue, if a third party who views the content clicks on the search link and, subsequently, a link to a sponsored search result. In another implementation, search code section 506 may include an identifier 577 corresponding to the network application host system that hosts the resource into which the content has been embedded (see FIG. 9H). A search system can use these entity identifiers to code one more links returned in the search results.

In one implementation, the content of the digital content object, when rendered, can itself be clickable, where a user click resolves to an ad link or a search link, above. As FIG. 9I illustrates, the content code section 500 may include HTML code that renders the displayed image clickable, resolving, for example, to an advertiser system through redirection messages. The link associated with the content, however, can incorporate a variety of the link types and data elements described herein.

Link-embedding code may also include other link types, such as a "buy content" link. In one particular implementation, activation of a "buy content" link initiates a purchase workflow on a remote server, where, for example, a user could purchase a higher quality digital image of the image content displayed in connection with the link, or a framed copy of the image.

C. Link Activation and Benefit Attachment Process and Message Flows

Activation of the links in content-embedding code can initiate a variety of processes and message flows, in particular implementations, some of the processes and message flows are directed to recording retrieval events in a manner that allows one or more entities to share in the revenue generated by activation of the links. For example, network application hosting site 40 may allow content embedding entities to determine which content objects generate more revenue relative to other content objects.

For example, network application hosting site 40 may track usage as relevant to appropriately compensate a content embedding entity. For example, in implementations discussed herein, link-embedding code may be configured to first direct messages to network application hosting site 40, which redirects a client application to a remote content host. In this manner, network application hosting site 40 may track link activations.

C.1. Advertisement Link

FIG. 10 shows an example page that may be returned as a result of clicking on an advertisement link. The URL of the page ultimately displayed to the user can be determined in a variety of ways. Clicking on the link that invoked the URL may generate revenue from the advertiser. This revenue may be shared between one or more of the entities described herein. For example, the revenue generated from an ad link may be shared between the content embedding entity and the network application hosting entity. As discussed described herein, the message flows between the various systems can contain information, such as entity identifiers and content identifiers, to allow for determinations of the revenues or other benefits to be shared by various entities.

When a user "clicks" on the ad link with a computer input device, a request is transmitted to initiate retrieval of the information associated with the ad link. In some implementations, each access or "click" on the ad link will be directed to network application hosting site, or some other system, to associate the "click" with the account identifier for an advertiser. This link activation, for example, may access account identification information coded into the ad link before accessing the advertiser's URL using the ad link clicked on by the user. The account identification information, is recorded in the advertiser's account along with information from the retrieval request as a retrieval request event. Since the information obtained through this mechanism matches an account identifier with a URL, accurate account debit records can be maintained.

In the ad links illustrated in FIGS. 9A and 9B, network application hosting site 40 may process the ad links as illustrated in FIG. 11A. For example, network application hosting site 40 may receive a request from a client application including an ad link (852). Network application hosting site 40 matches one or more aspects of the ad link to an advertiser account (854) and logs a retrieval event to the identified, account (856). Network application hosting site 40 may use these logs to debit or charge the account as well. Network application hosting site 40 then transmits a response including a redirection message to the client application. The redirection message includes a link to an ad, which in one implementation is displayed by the client application. In the ad link of FIG. 9C, network application hosting site 40, for example, may access a data store to map the coded identifier to an ad locator.

For the ad link illustrated in FIG. 9D, for example, network application hosting site 40 may use an expanded process flow, such as the method illustrated in FIG. 11B. As discussed above, when an ad link is activated, network application hosting site 40 may receive a request from a client application including the ad link (852). Network application hosting site 40 matches one or more aspects of the ad link to an advertiser account (854), and logs a retrieval event, to the identified account (856). Network application hosting site 40 determines the revenue (or other compensation) attributable to the retrieval event (860), and determines the share of the revenue provided to one or more of the entities identified in the ad link. As discussed above, revenue resulting from the user click may be distributed to one or more of the content embedding entity, and the network application hosting entity. In implementations where more than one entity is entitled to revenues, network application hosting site 40 determines the revenue shares of the one or more entities (862), and credits the respective accounts of the one more identified entities according to the computed revenue shares (864). Network application hosting site 40 also transmits a response including a redirection message (858). Other implementations are possible. For example, network application hosting site 40 can simply log the retrieval event and one or more entity identifiers for later batch processing.

FIG. 11C illustrates a method that network application hosting site can use in connection with ad links where the matching ad link is dynamically selected. FIG. 12 is a block diagram illustrating an example message flow resulting from the execution of the method illustrated in FIG. 11C. In the particular implementation shown, when the ad link is activated, network application hosting site 40 receives a request including an ad link from client node 86 (852) (FIG. 13, Ref. No. 1). Network application hosting site 40 transmits a request for a matching ad to ad search system 50 using the one or more keywords in the request (872) (FIG. 13, Ref. No. 2), and receives a response including a link to a matching ad (874) (FIG. 13, Ref. No. 3). Network application hosting site 40 composes a redirection message and transmits it to client node 86 (876) (FIG. 13, Ref. No. 4), causing the client node to transmit a request, and receive a response from, advertiser system 65 (FIG. 13, Ref. Nos. 5 & 6). Other implementations and message flows are possible. For example, network application hosting site 40 and ad search system 50 can communicate indirectly through client node 86, using redirect messages.

Network application hosting site 40 also logs the retrieval event to one or more entity accounts identified in the ad link transmitted by client node 86 (878), and determine the revenue associated with the retrieval event (880) and the revenue shares of one or more of the identified entities (882). In the particular implementation illustrated in FIG. 6G, for example, network application hosting site 40 may credit the account of the content embedding entity (ceeid) (884).

C.2. Search Link

FIG. 13 illustrates a page of search results that may result from clicking on a search link. In the particular implementation shown, the page includes a sponsored results section including sponsored links 002 to advertising, marketing or other promotional material. The sponsored links 902 generate fees when clicked pursuant to a pay-per-click (PPC) mechanism. These fees may be shared among one or more entities associated with the network application hosting site 40. In other implementations, mere presentation of the sponsored search links themselves may result in revenue according to a pay-per-impression (PPI) revenue model.

FIG. 14 illustrates an example message flow, according to one particular implementation, that could result upon activation of a search link similar to those illustrated in FIGS. 9G and 9H. In the search links illustrated in these FIGS., link activation causes a client node to transmit a search request, identifying one or more entities, to search system 70. In one implementation, the search system 70 is operative to recognize and appropriately handle the entity identifiers appended to the search link. In one implementation, the search link includes an identifier of the network application hosting site 40 to allow search system 70 to identify network application hosting site 40, as well. This may be useful in circumstances where search system 70 operates in connection with multiple network application hosting sites 40 and tracks the revenue attributable to each such system.

FIGS. 1SA, 15B & 15C illustrate example methods that search system 70 may use in connection with particular implementations. As FIG. 15A illustrates, when search system 70 receives a search request (942) (see FIG. 14, Ref. No. 1), it generates search results including one or more links to respective network resources (946). In the particular implementation shown, at least a portion of the search results contains links to sponsored content (such as advertisement pages, advertiser home pages, and the like). In one implementation, search system 70, as discussed above, receives revenue from an advertiser or other enterprise associated with a link, if a user clicks on it. To allow search system 70 to track user clicks, the sponsored search links, in one implementation, include URLs that correspond to search system 70, but also include encoded information that maps to a URL of an advertiser. Accordingly, in the implementation shown, search system 70 generates encoded URL identifiers for one or more URLs of sponsored search results (946), and adds these encoded URL identifiers as a parameter to a redirection URL that identifies search system 70 (948). For example, the encoded URL identifier may be one or more strings and be included, in the following example URL: http://search.yahoo.com/_rdrct=UJASf4&SIG=11aygd. In one implementation, search system 70 stores the encoded. URL identifier in association with the corresponding sponsored link for later use. After generating one or more encoded URLs for inclusion in the search results, search system 70 may transmit the results to the requesting client node (954) (see FIG. 15, Ref. No. 2).

As discussed above, the search link may include one or more entity identifiers associated with a benefit attachment mechanism. For example, as FIGS. 9G and 9H illustrate, the search link may be encoded with one or more entity identifiers that, when included in a message to search system 70, trigger one or more processes described herein. As FIG. 15A illustrates, if the ad link indicates a compensation attachment (950), search system 70, in one implementation, stores the one or more entities identified in the search request to the corresponding encoded URL identifiers returned in the search results (952). These associations could also extend to additional encoded URL identifiers if the user requests additional search results.

FIG. 15B illustrates an example method that may be executed when a user clicks on a sponsored link in a set of search results. In the particular implementation shown, when search system 70 receives a retrieval request including an encoded URL identifier (980) (see FIG. 14, Ref. No. 3), it retrieves the sponsored URL or link that maps to the encoded URL identifier (962), and transmits the sponsored link in a redirection message (964) (see FIG. 14, Ref. No, 4) causing the client node 86 to transmit a request, and receive a response from, advertiser system 65 (FIG. 14, Ref. Nos, 5 & 6). In one implementation, search system 70 may simply log the retrieval event with relevant data (such as entity identifiers) and process account-related matters in a separate process. In the implementation shown, search system 70 determines the revenue associated with the retrieval event and, in one implementation, debits or charges the account corresponding to the sponsored link that was returned to the user (966). If a benefit attachment is associated with the retrieval event (968), search system 70 may log the retrieval event to one or more entity accounts (970), determine revenue shares for one or more entities, and credit the accounts of one or more entities according to the revenue shares.

Other implementations are possible. For example, search system 70 may distribute revenues to, or credit an account of, network application hosting site 40, leaving it to such systems to distribute resulting revenues to one or more entities. As FIG. 15C illustrates, search system may generate a retrieval event-record (980), transmit it to network application hosting site 40 (982) (see FIG. 14, Ref. No. 7), and credit the account of network application hosting site 40 (984). Search system 70 may also record the retrieval event and subsequently process it in connection with other events in a batch process.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method comprising:
accessing, by a computing device, a network resource model to identify a digital media object in a network resource, the network resource comprising a web page associated with a user and the digital media object previously embedded in the web page by the user, wherein the user is a person;
analyzing, by the computing device, meta tags associated with the digital media object;
determining, by the computing device, a topic relating to the meta tags;
selecting, by the computing device, ad content based on the topic;
identifying, by the computing device, data displayed on the web page and surrounding the digital media object within a context of the network resource model;
extracting, by the computing device, one or more first terms from the data displayed on the web page and surrounding the digital media object;
determining, by the computing device, whether to construct one or more hyperlinks based on formatting parameters associated with the digital media object; and
when the formatting parameters associated with the digital media object are above a predetermined threshold:
constructing, by the computing device, the one or more hyperlinks based on the one or more first terms and the ad content, the one or more hyperlinks comprising a content embedding entity identifier, the content embedding entity identifier comprising an identification of the user, the content embedding entity identifier in the one or more hyperlinks to allow for determinations of benefits to be shared by entities; and
inserting, by the computing device, the one or more hyperlinks into the web page in proximity to the digital media object without affecting the digital media object so that the one or more hyperlinks can be viewed when the web page is viewed.

2. The method of claim 1 further comprising
transmitting, by the computing device, the one or more extracted terms to a remote host;
receiving, by the computing device, one or more resource locators from the remote host; and
using, by the computing device, the one or more resource locators in the constructing of the one or more hyperlinks.

3. The method of claim 1 wherein the data surrounding the digital media object are data collocated within the same section of the network resource model as the digital media object.

4. The method of claim 3 wherein the section is defined by one or more HTML <div>tags.

5. The method of claim 1 wherein the surrounding data is text content.

6. The method of claim 1 wherein a first hyperlink of the one or more hyperlinks identifies a network addressable advertiser resource, wherein the first hyperlink, when activated, causes a processor of the computing device to access the network addressable advertiser resource.

7. The method of claim 6 wherein the first hyperlink, when activated, causes the processor to access the network addressable advertiser resource in a redirection process with a remote server.

8. The method of claim 1 further comprising
determining, by the computing device, a user identifier associated with the network resource model;
encoding, by the computing device, the user identifier as the content embedding entity identifier into the one or more hyperlinks.

9. The method of claim 1 further comprising
generating, by the computing device, link embedding code causing a processor of the computing device to render the digital media object as a clickable region, which, when clicked, causes the processor to access a network addressable advertiser resource.

10. The method of claim 1 wherein a first hyperlink of the one or more hyperlinks identifies a search system, wherein the first hyperlink, when activated, causes a processor to access the search system.

11. The method of claim 10 wherein the first hyperlink is configured to include one or more of the extracted terms, and wherein the first hyperlink, when activated, causes the processor to access the search system using the one or more extracted terms.

12. A computing device comprising:
a processor;
a storage medium for tangibly storing thereon program logic for execution by the processor, the program logic comprising:
logic executed by the processor for accessing a network resource model to identify a digital media object in a network resource, the network resource comprising a web page associated with a user and the digital media object previously embedded in the web page by the user, wherein the user is a person;
logic executed by the processor for analyzing meta tags associated with the digital media object;
logic executed by the processor for determining a topic relating to the meta tags;
logic executed by the processor for selecting ad content based on the topic;
logic executed by the processor for identifying data displayed on the network resource and surrounding the digital media object within a context of the network resource model;
logic executed by the processor for extracting one or more first terms from the data displayed on the web page and surrounding the digital media object;
logic executed by the processor for determining whether to construct one or more hyperlinks based on formatting parameters associated with the digital media object; and
when the formatting parameters associated with the digital media object are above a predetermined threshold:
logic executed by the processor for constructing the one or more hyperlinks based on the one or more first terms, the one or more hyperlinks comprising a content embedding entity identifier, the content embedding entity identifier comprising an identification of the user, the content embedding entity identifier in the one or more hyperlinks to allow for determinations of benefits to be shared by entities; and
logic executed by the processor for inserting the one or more hyperlinks into the web page in proximity to the digital media object without affecting the digital media object so that the one or more hyperlinks can be viewed when the web page is viewed.

13. The computing device of claim 12, wherein the program logic further comprises:
   logic executed by the processor for transmitting the one or more extracted terms to a remote host;
   logic executed by the processor for receiving one or more resource locators from the remote host; and
   logic executed by the processor for using the one or more resource locators in the constructing of the one or more hyperlinks.

14. The computing device of claim 12, wherein the data surrounding the digital media object are data collocated within the same section of the network resource model as the digital media object.

15. The computing device of claim 14, wherein the section is defined by one or more HTML <div>tags.

16. The computing device of claim 12, wherein the surrounding data is text content.

17. The computing device of claim 12, wherein a first hyperlink of the one or more hyperlinks identifies a network addressable advertiser resource, wherein the first hyperlink, when activated, causes a processor to access the network addressable advertiser resource.

18. The computing device of claim 17, wherein the first hyperlink, when activated, causes the processor to access the network addressable advertiser resource in a redirection process with a remote server.

19. The computing device of claim 12, wherein the program logic further comprises:
   logic for determining a user identifier associated with the network resource model;
   logic for encoding the user identifier as a content embedding entity identifier into the one or more hyperlinks.

20. The computing device of claim 12, wherein the program logic further comprises:
   logic for generating link embedding code to cause the processor to render the digital media object as a clickable region, which, when clicked, causes the processor to access a network addressable advertiser resource.

21. The computing device of claim 12, wherein a first hyperlink of the one or more hyperlinks identifies a search system, wherein the first hyperlink, when activated, causes the processor to access the search system.

22. The computing device of claim 21, wherein the first hyperlink is configured to include one or more of the extracted terms, and wherein the first hyperlink, when activated, causes the processor to access the search system using the one or more extracted terms.

\* \* \* \* \*